Dec. 3, 1963      M. N. GILBERT, JR., ETAL      3,113,011
LAMP SEALING APPARATUS
Filed Dec. 28, 1961      18 Sheets-Sheet 5

MARCELLUS N. GILBERT JR.
ERLE H. DODGE
INVENTORS

BY *Joseph C. Ryan*
ATTORNEY

MARCELLUS N. GILBERT JR.
ERLE H. DODGE
INVENTORS

BY Joseph C. Ryan
ATTORNEY

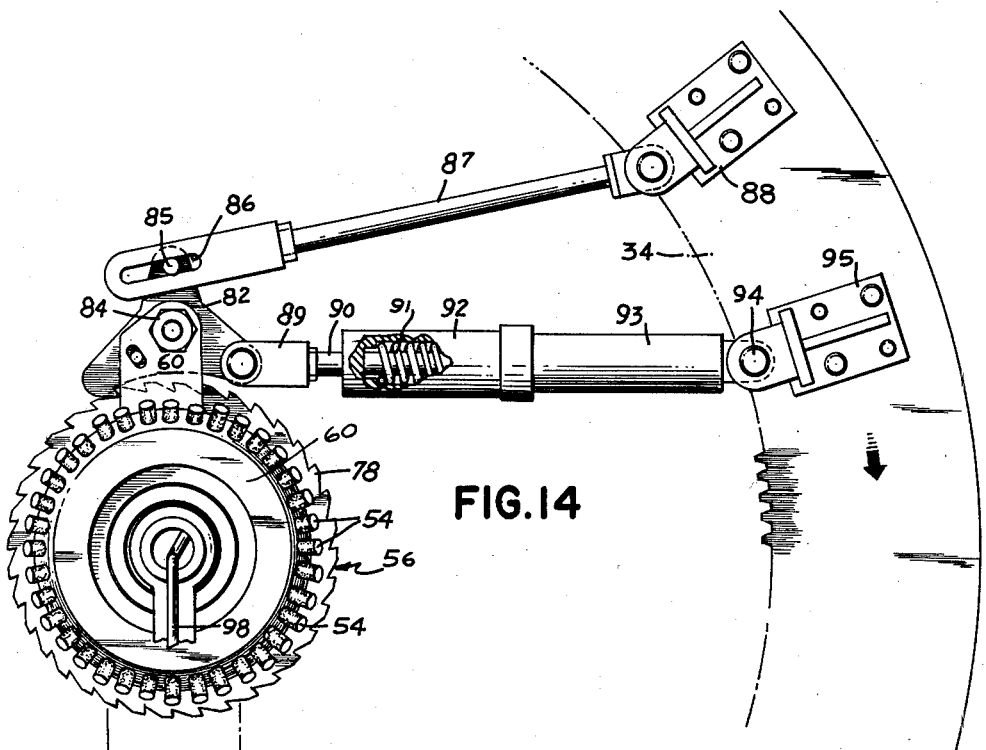
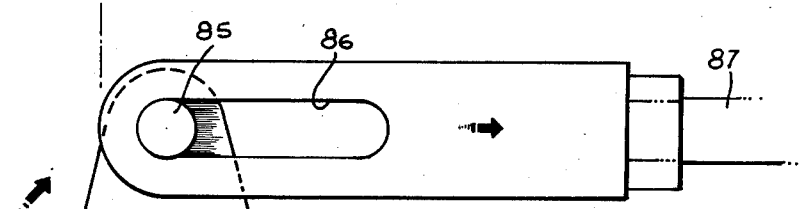
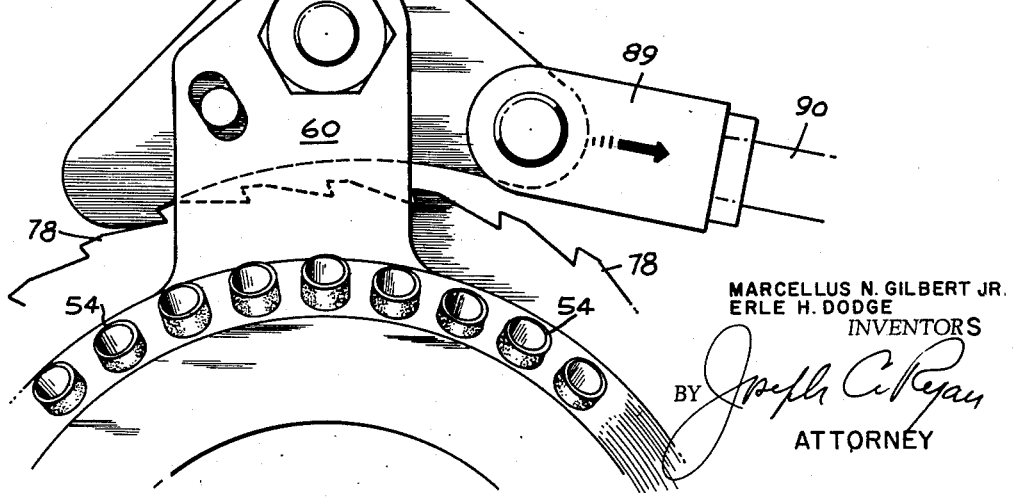

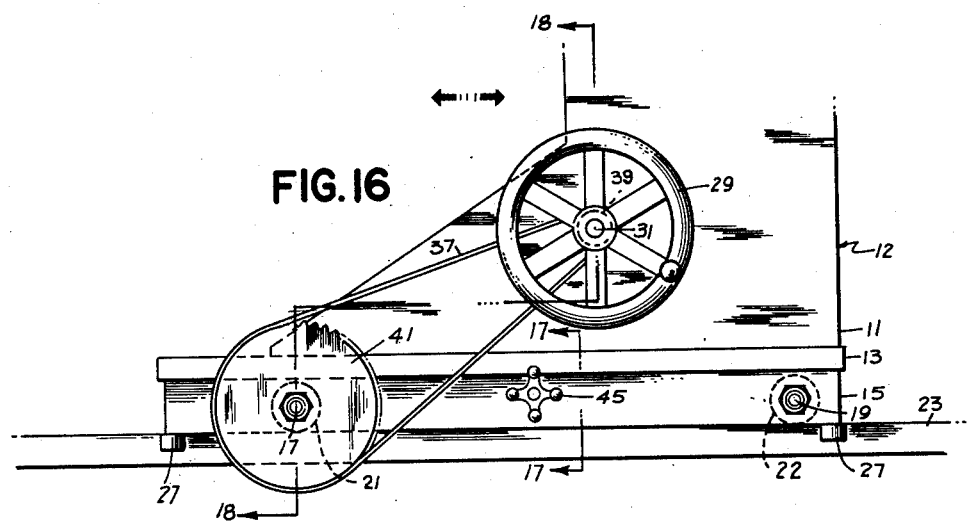
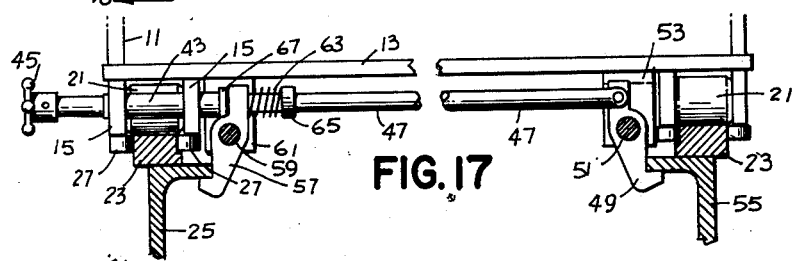
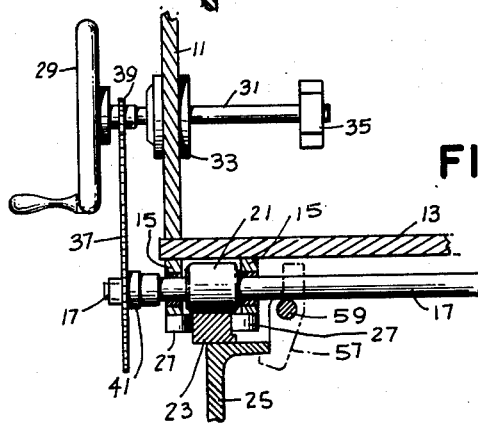

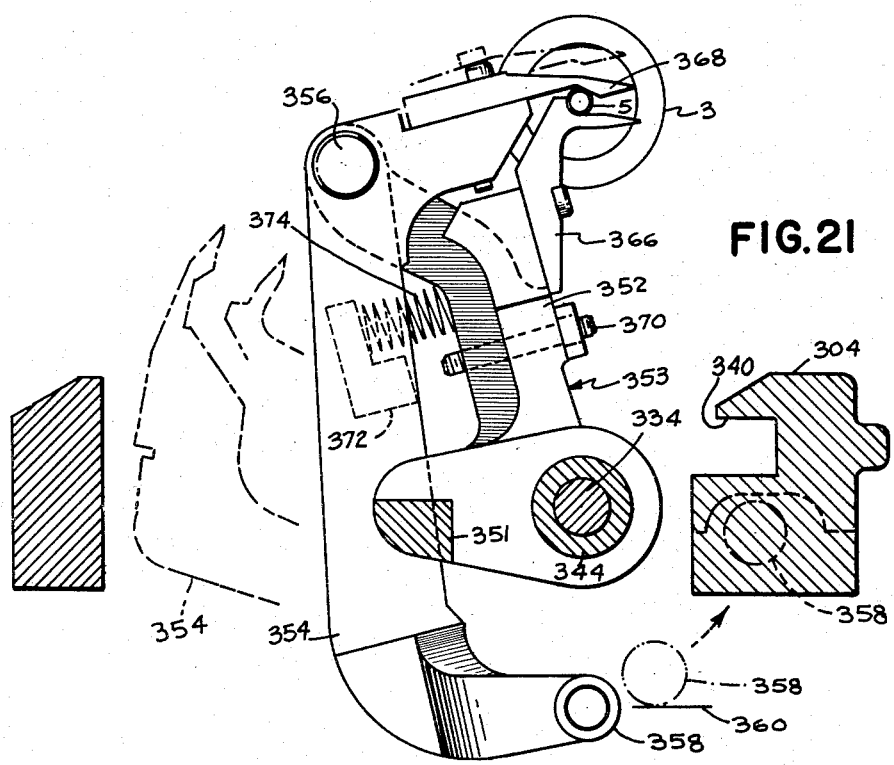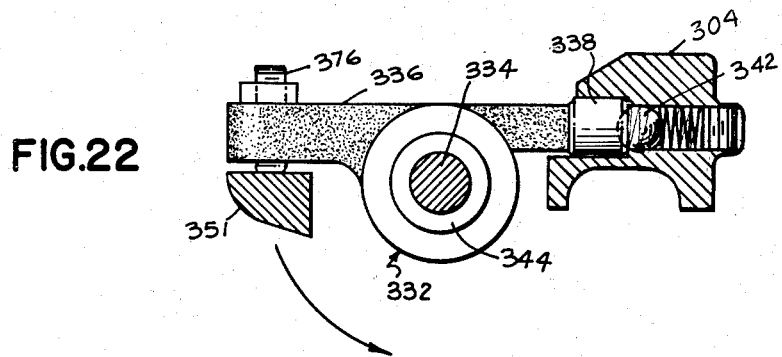

Dec. 3, 1963  M. N. GILBERT, JR., ETAL  3,113,011
LAMP SEALING APPARATUS
Filed Dec. 28, 1961  18 Sheets-Sheet 14
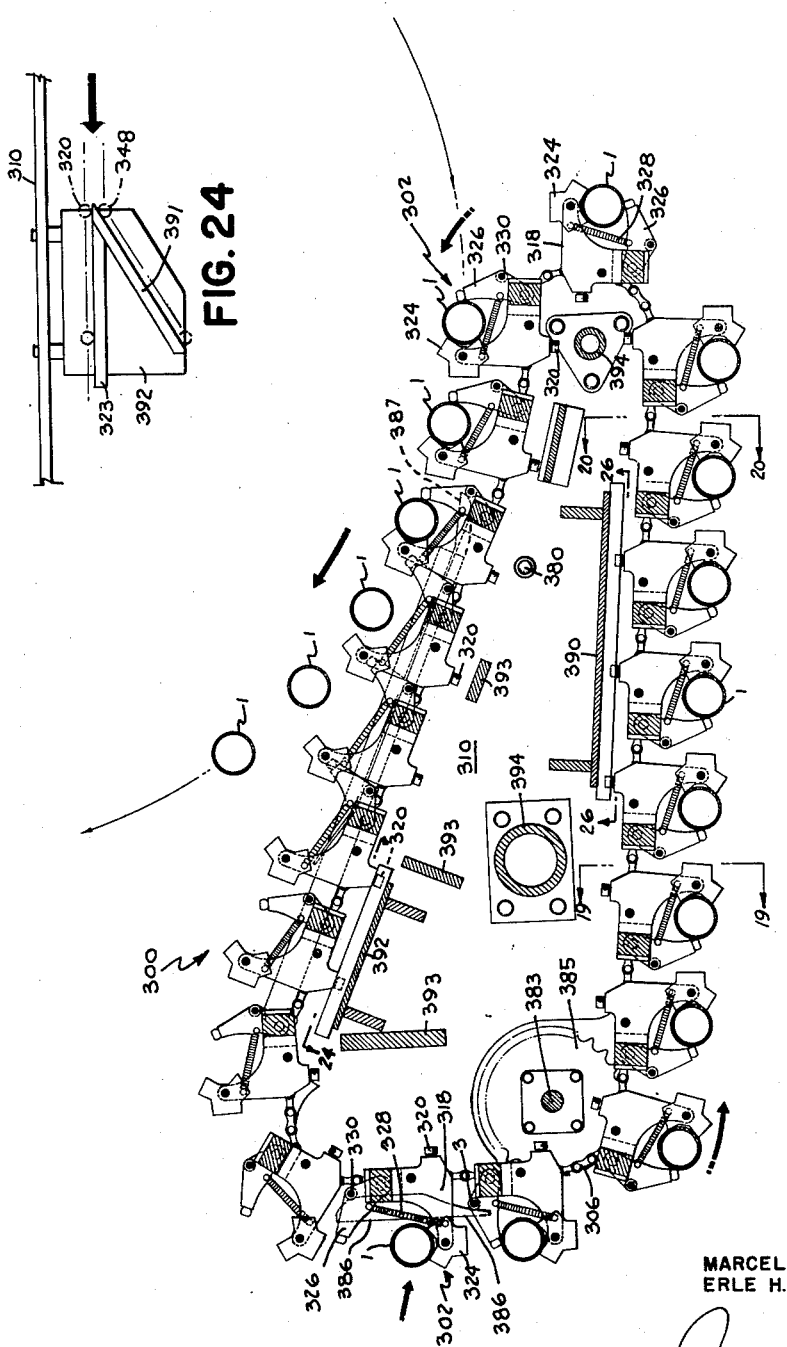
MARCELLUS N. GILBERT JR
ERLE H. DODGE
INVENTORS
BY *Joseph C. Ryan*
ATTORNEY

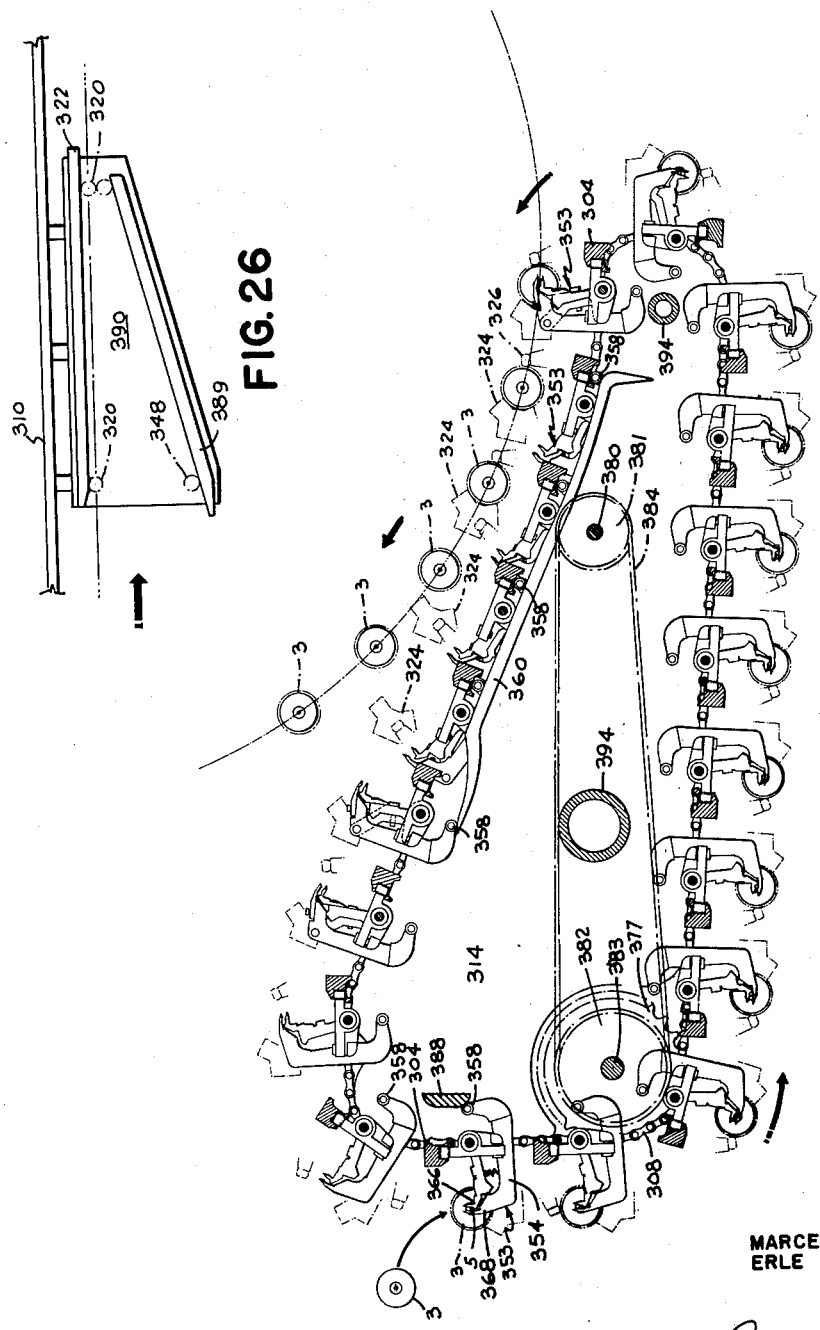

Dec. 3, 1963  M. N. GILBERT, JR., ETAL  3,113,011
LAMP SEALING APPARATUS
Filed Dec. 28, 1961  18 Sheets-Sheet 16
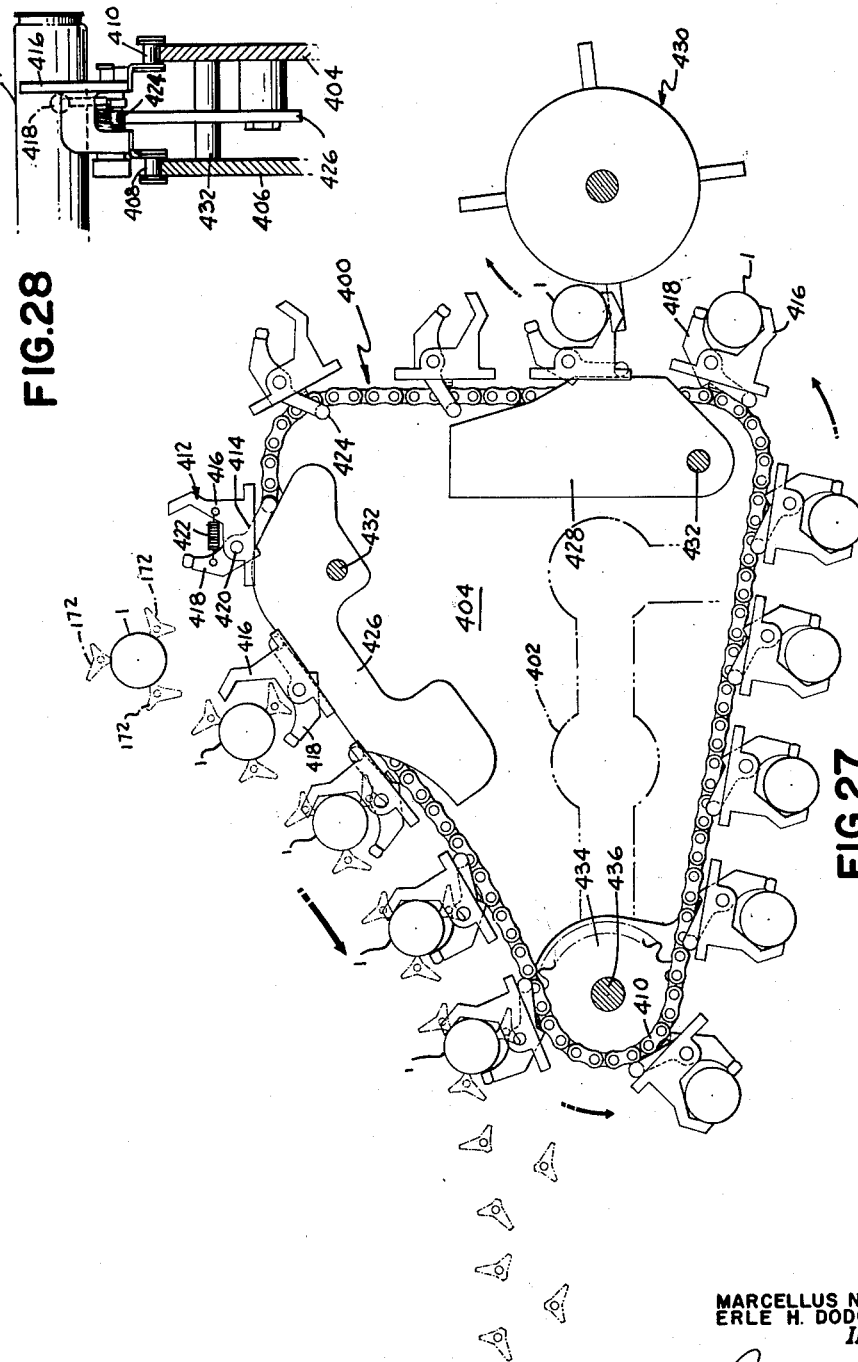
MARCELLUS N. GILBERT JR
ERLE H. DODGE
INVENTORS
BY *Joseph C. Ryan*
ATTORNEY

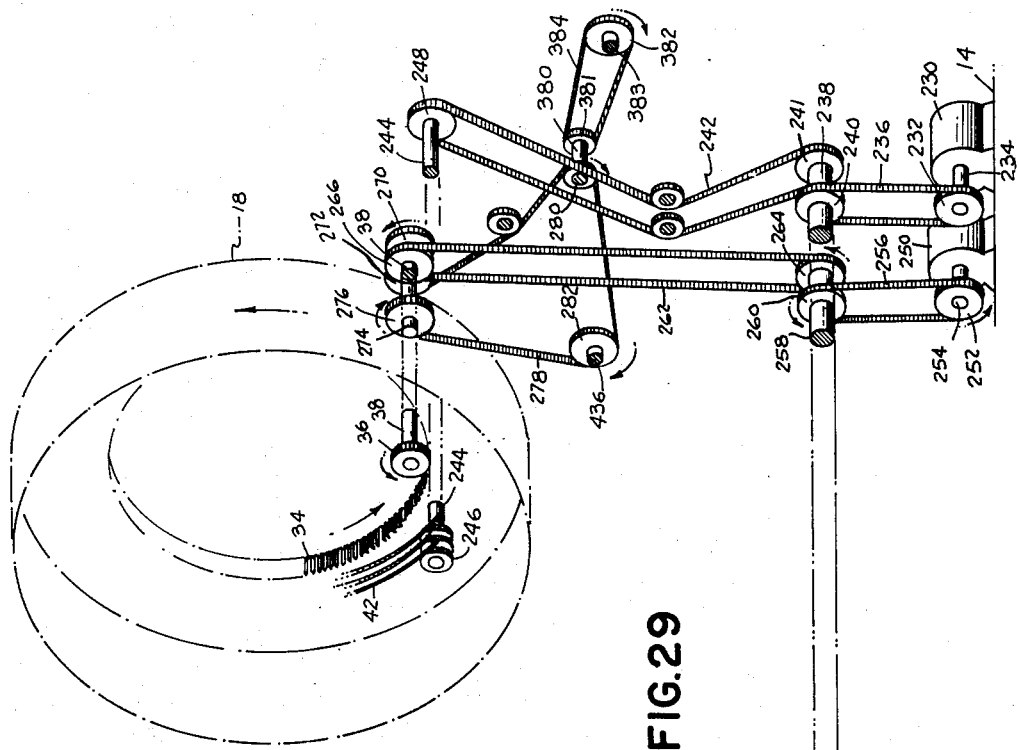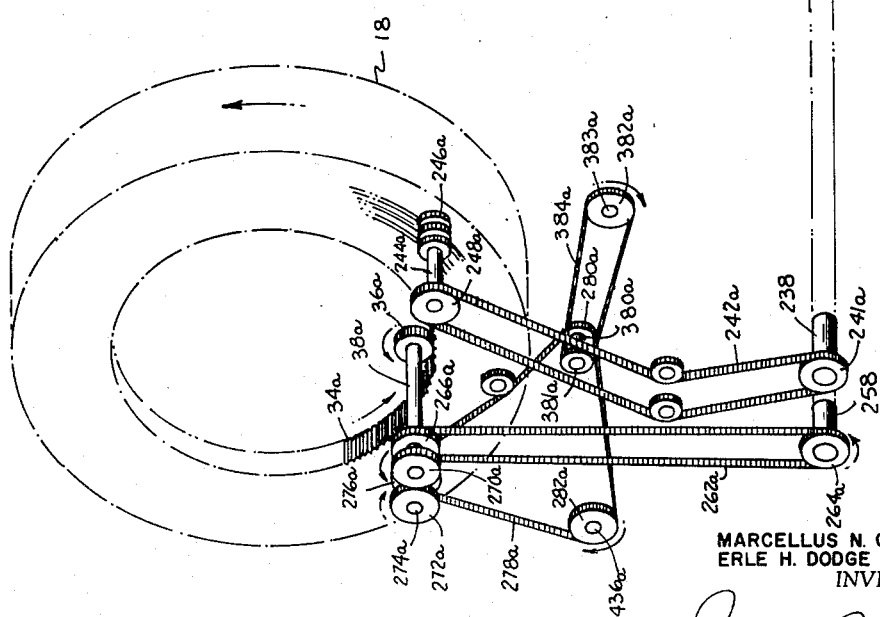

Dec. 3, 1963   M. N. GILBERT, JR., ETAL   3,113,011
LAMP SEALING APPARATUS
Filed Dec. 28, 1961   18 Sheets-Sheet 18

MARCELLUS N. GILBERT JR.
ERLE H. DODGE
INVENTORS

BY *Joseph C. Ryan*
ATTORNEY 3,113,011
LAMP SEALING APPARATUS
Marcellus N. Gilbert, Jr., Lynnfield, and Erle H. Dodge, Beverly, Mass., assignors to Sylvania Electric Products Inc., a corporation of Delaware
Filed Dec. 28, 1961, Ser. No. 162,826
20 Claims. (Cl. 65—138)

This invention relates to the manufacture of electric lamps and the like, and more particularly to the manufacture of elongated tubular lamps of the fluorescent type in which a lamp mount is sealed in each end of the lamp tube to define a hermetically sealed lamp envelope.

Two of the major manufacturing operations performed in the manufacture of elongated tubular lamps, such as fluorescent lamps for example, are lamp sealing and lamp exhausting. In the lamp sealing operation, a pair of lamp mounts are sealed to the ends of a lamp tube to define a hermetically sealed lamp envelope. At least one of these lamp mounts is provided with an exhaust tube. In the subsequent lamp exhausting operation, the lamp envelope is evacuated through this exhaust tube, provided with a filling of an inert gas and mercury and finally the exhaust tube is sealed or tipped-off. Over the years these two major manufacturing operations have usually been performed with the lamp tube disposed in a vertical plane. The lamp sealing apparatus disclosed in U.S. Patent 2,349,822 is illustrative of the type of lamp sealing apparatus generally used to perform the lamp sealing operation and the lamp exhaust apparatus disclosed in U.S. Patent 2,294,400 is illustrative of the type of lamp exhausting apparatus generally used.

When a lamp sealing apparatus of the type disclosed in U.S. Patent 2,349,822 is employed, sealing of the mounts to the ends of the lamp tube is effected sequentially, i.e., first a mount is sealed in one end of the lamp tube, the lamp tube is then rotated 180° and finally a lamp mount is sealed in the other end thereof. Sequential sealing of the lamp mounts to the lamp tube has long been recognized in the art as a time-consuming operation limiting considerably the speed with which this particular lamp manufacturing operation may be performed. A lamp sealing apparatus in which sealing of a pair of mounts to the ends of the lamp tube is effected simultaneously is disclosed in the U.S. Patent 2,721,422. In accordance with the teachings of that patent, the lamp tubes are disposed horizontally instead of vertically and each lamp tube is supported in and carried by an elongated head, longer than the lamp tube itself, which spans a pair of spaced endless chain conveyors which advance the heads through a path along which two banks of heating units for sealing the lamp mounts to the ends of the lamp tubes are disposed. As the articles of work are advanced by the heads which support them, the two banks of heating units are reciprocated along the path and oscillated into and out of heating relationship with respect to the mount to be sealed to the ends of the lamp tube.

Although the lamp sealing apparatus disclosed in U.S. Patent 2,721,422 represents a substantial improvement over the art since it makes possible simultaneous sealing of a pair of lamp mounts to the ends of a lamp tube, this apparatus also has its limitations. For example, it is not adjustable to readily permit sealing of lamp tubes of different lengths or diameters. The burner arrangement limits the speed with which the lamp sealing operation may be performed because of the compound reciprocating and oscillating motions required to heat the work.

In view of the foregoing, one of the principal objects of this invention is to provide a continuous motion lamp sealing apparatus, for simultaneously sealing a pair of lamp mounts to the ends of a lamp tube, which is readily adjustable to permit the sealing operation to be performed on lamp tubes of different lengths.

Another object of this invention is to provide a continuous motion lamp sealing apparatus, for simultaneously sealing a pair of lamp mounts to the ends of a lamp tube, which is readily adjustable to accommodate lamp tubes of different diameters.

A further object of this invention is to provide a continuous motion lamp sealing apparatus for simultaneously sealing lamp mounts into each end of a lamp tube in which separate, independent burners are provided for effecting the sealing operation at each end of each lamp tube.

A further object of this invention is to provide these burners with a system for feeding combustible gases thereto in which various mixtures of these combustible gases may be fed to the burners during the work-heating period.

A further object of this invention is to provide each head of the lamp sealing apparatus with its own seal working device for shaping the seal being formed by a fusion of the mount to the end of the lamp tube.

A further object of this invention is to provide a lamp tube and mount feeding unit for this lamp sealing apparatus which is also readily adjustable for feeding lamp tubes of different lengths and diameters.

Further objects, advantages and features of the apparatus of this invention will be readily apparent to those skilled in the art from the description of a specific embodiment thereof set forth below and the accompanying drawings in which a specific embodiment is illustrated.

In the specific embodiment of the apparatus of this invention illustrated in the accompanying drawings and described below, a plurality of sealing heads 100 (FIGS. 1–4) are disposed about the periphery of a spider 18 rotatably supported in a stationary pedestal 10. Paired therewith is a plurality of heads 100 disposed about the periphery of a spider 18 rotatably supported in an adjustable pedestal 12. The pedestal 12 may be moved closer to or further away from pedestal 10 to accommodate lamp tubes of different lengths. Each of the spiders 18 moves continuously through 360°, being driven by a gear-pinion arrangement 34, 36 (FIG. 29). During a portion of the 360° cycle of each of the spiders 18, the mount pin 188 (FIGS. 4 and 9–11) and the tube chuck arms 166 of each of the heads 100 on each of the spiders 18 are rotated about the longitudinal axis of the lamp tube 1 while the burner 190 of each of the heads 100 is heating the work. This rotation is effected by a sprocket 124, on each of the heads 100 which meshes with a chain 42, the drive for which is shown particularly in FIG. 29. A valve assembly 56 (FIGS. 13–15) is supported on each of the pedestals 10 and 12 for supplying combustible gases to the heads 100. The arrangement of this valve assembly is such that various mixtures of combustible gases are fed to the burners 190 of each of the heads 100 during a heating cycle and this supply of combustible gases to the burners is maintained uninterrupted during the continuous movement of the heads.

Each of the heads 100 includes three equally spaced tube chuck fingers 172 which support the lamp tube 1 (FIGS. 4–11). As shown in FIG. 5 for example, the configuration of these tube chuck fingers 172 is such that these fingers may be readily adjusted to support lamp tubes of different diameters and maintain the lamp tubes on a common axis with respect to the heads 100 which support them.

The lamp tube and mount loader 300 comprises a pair of similar units, one associated with the stationary pedestal 10 and the other with the adjustable pedestal 12. A plurality of paired heads 302 (FIGS. 19–26) are disposed on each of these two units of the lamp tube and mount loader 300. Each of the heads 302 is provided with a mount carrier 353 and a tube cradle 324 for supporting a lamp tube 1 near an end thereof. As shown in FIG. 23, the configuration of the cradles 324 is such that these cradles may be readily adjusted to support lamp tubes of different diameters so that, regardless of diameter, they will always lie on a common horizontal axis. A lamp mount 3 is inserted in each end of the lamp tube 1 on the loader 300 and the lamp tube 1 with a mount 3 in abutting relationship therewith at each end thereof is presented to the heads 100 of the lamp sealing unit described above. Upon completion of the lamp sealing operation sealed lamps are released by the heads 100 to a lamp unloader 400 (FIGS. 1, 3 and 27).

In the accompanying drawings in which a specific embodiment of the apparatus of our invention is illustrated, FIG. 1 is an elevational view taken along the line 1—1 of FIG. 2 showing the unit of the lamp sealing apparatus associated with the adjustable pedestal and also showing in phantom those portions of the lamp tube and mount loader and lamp unloader associated therewith.

Figure 9:
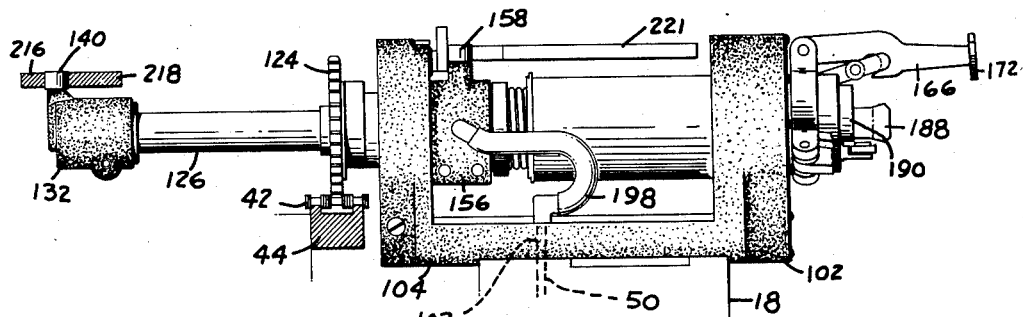
Figure 10:
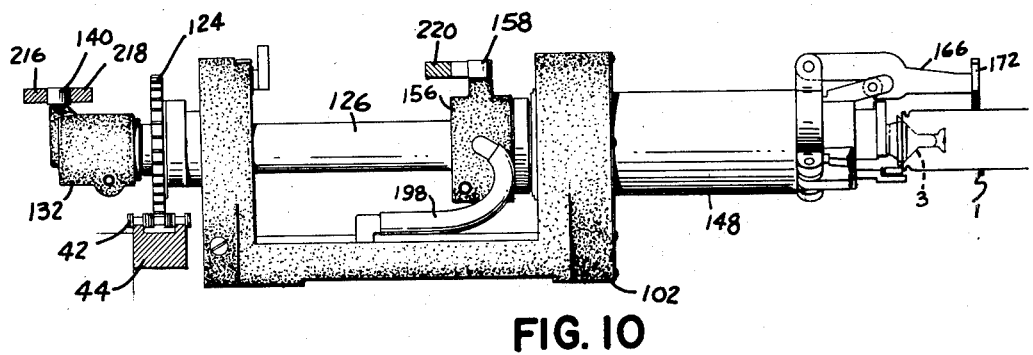
Figure 11:
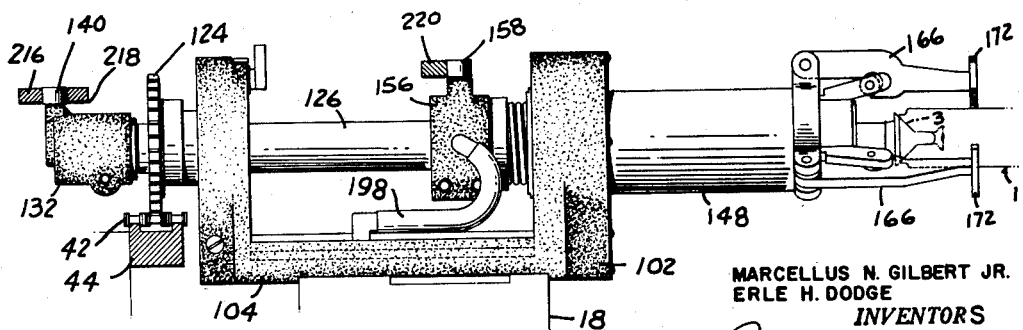

FIGS. 9–11 are elevational views of the sealing apparatus head assembly showing the head and the means employed to actuate certain members thereof. In FIG. 9 the head is shown in its rest position looking in the direction 9—9 of FIG. 12. In FIG. 10 the head is shown in its seal working position looking in the direction 10—10 of FIG. 12. In FIG. 11 the head is shown in the work heating position looking in the direction 11—11 of FIG. 12.

Figure 12:
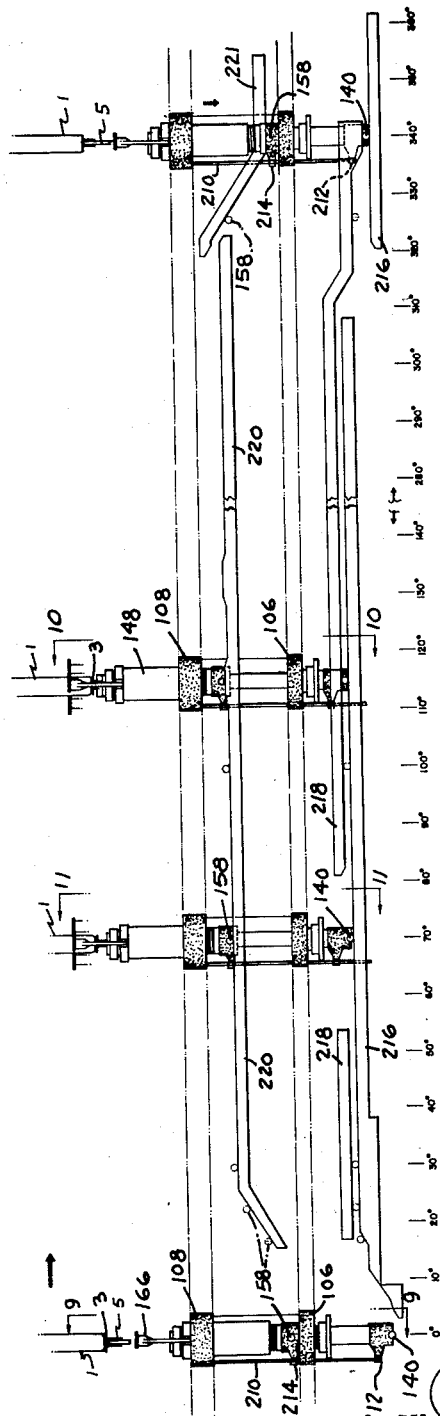

FIG. 12 is a developed schematic diagram of the several cam tracks which actuate the head of FIGS. 9–11 during one operating cycle.

Figure 13:
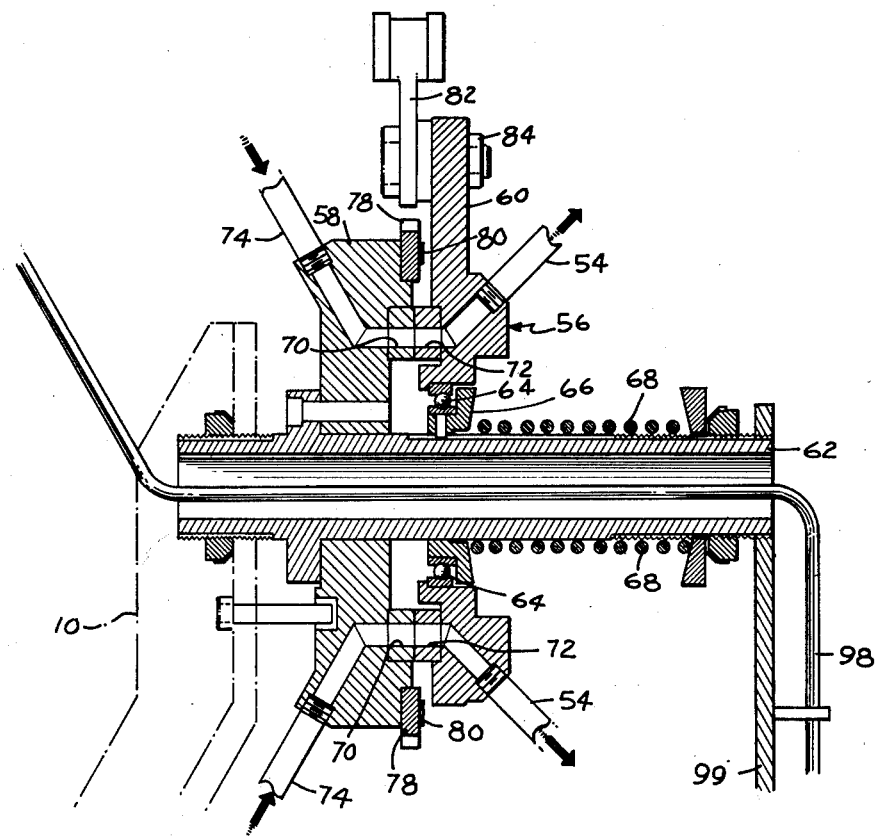

FIG. 13 is a transverse sectional view of the sealing valve assembly associated with the stationary pedestal.

FIG. 14 is an elevational view of the valve of FIG. 13 showing particularly the means employed to actuate the movable plate thereof.

FIG. 15 is an enlarged fragmentary detail of the pawl and ratchet assembly employed to actuate the movable plate of the valve of FIGS. 13 and 14.

FIG. 16 is a side elevational view of the lower portion of the adjustable pedestal showing particularly the means employed to support it and to effect adjustment of its position.

FIG. 17 is a cross sectional detail, taken along the line 17—17 of FIG. 16, showing the means employed to secure the adjustable pedestal in position.

FIG. 18 is a fragmentary detail partly in section showing the means for displacing the adjustable pedestal on its base.

Figure 19:
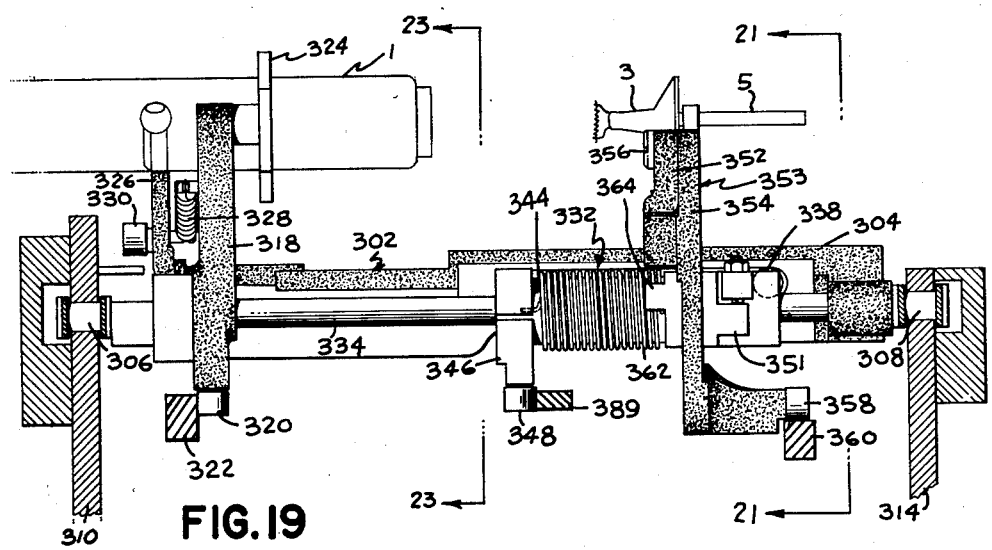

FIG. 19 is a side elevational view of one of the heads of the tube and mount loader shown in its rest position with the articles of work supported thereby.

Figure 20:
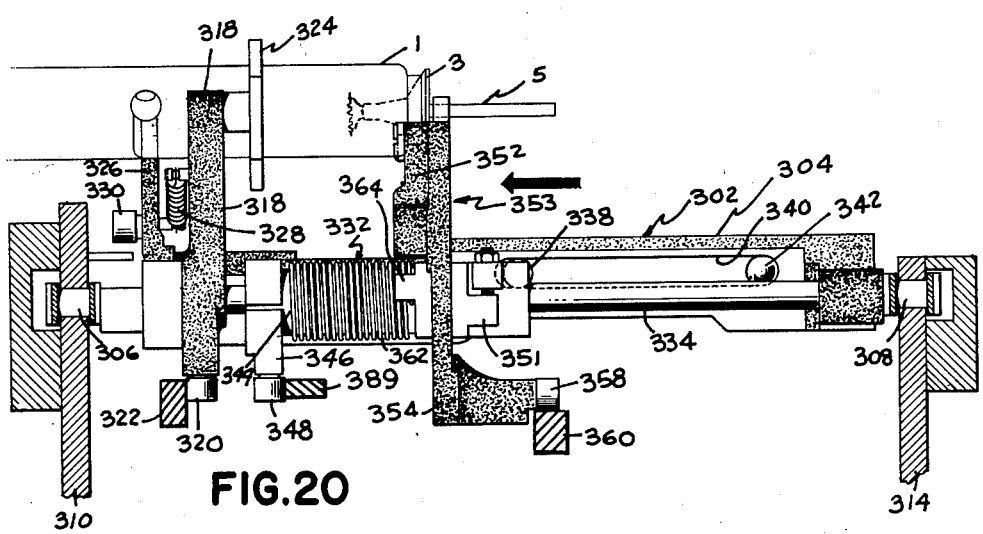

FIG. 20 is a side elevational view of one of the heads of the tube and mount loader showing particularly the mount carrier thereof in its forward position for insertion of a mount carried thereby into an open end of the lamp tube.

FIG. 21 is an enlarged detail of the mount carrier looking in the direction 21—21 of FIG. 19.

FIG. 22 is a detail of the base plate of the cross head of the head of FIGS. 19 and 20 showing particularly the means employed to positively define the limits of the stroke of the cross head.

FIG. 23 is an elevational view in section of the tube and mount loader looking in the direction 23—23 of FIG. 19.

FIG. 24 is a detail plan view of the cam track arrangement for returning the cross head of FIGS. 19 and 20 into its rest position, looking in the direction 24—24 of FIG. 23.

FIG. 25 is a side elevational view, partly in section showing particularly the mount carriers of the lamp tube and mount loader and the drive for actuating this loader.

FIG. 26 is a detailed plan view of the cam track assembly for effecting insertion of a mount into the open end of a lamp tube as shown in FIG. 20, this view looking in the direction 26—26 of FIG. 23.

FIG. 27 is a side elevational view of the lamp unloader with one of the side supporting plates removed to illustrate more clearly the means employed for actuating the heads thereof.

FIG. 28 is a sectional detail looking in the direction 28—28 of FIG. 27 showing particularly the means for supporting the heads of the lamp unloader.

FIG. 29 is a schematic illustration of the drive for effecting head rotation, spider rotation and movement of both the lamp tube and mount loader and the lamp unloader.

Figure 30:
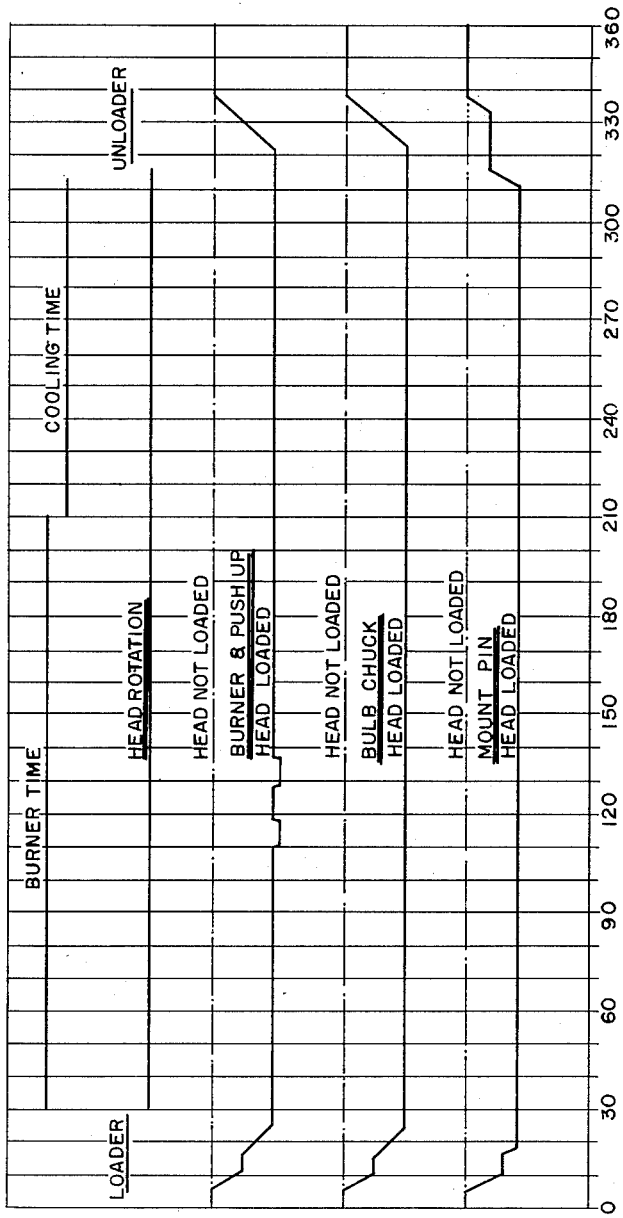

FIG. 30 is a developed cam chart showing the sequence of operations of the components of the head assembly of the sealing apparatus during an operating cycle thereof.

THE HEADS

Figure 4:
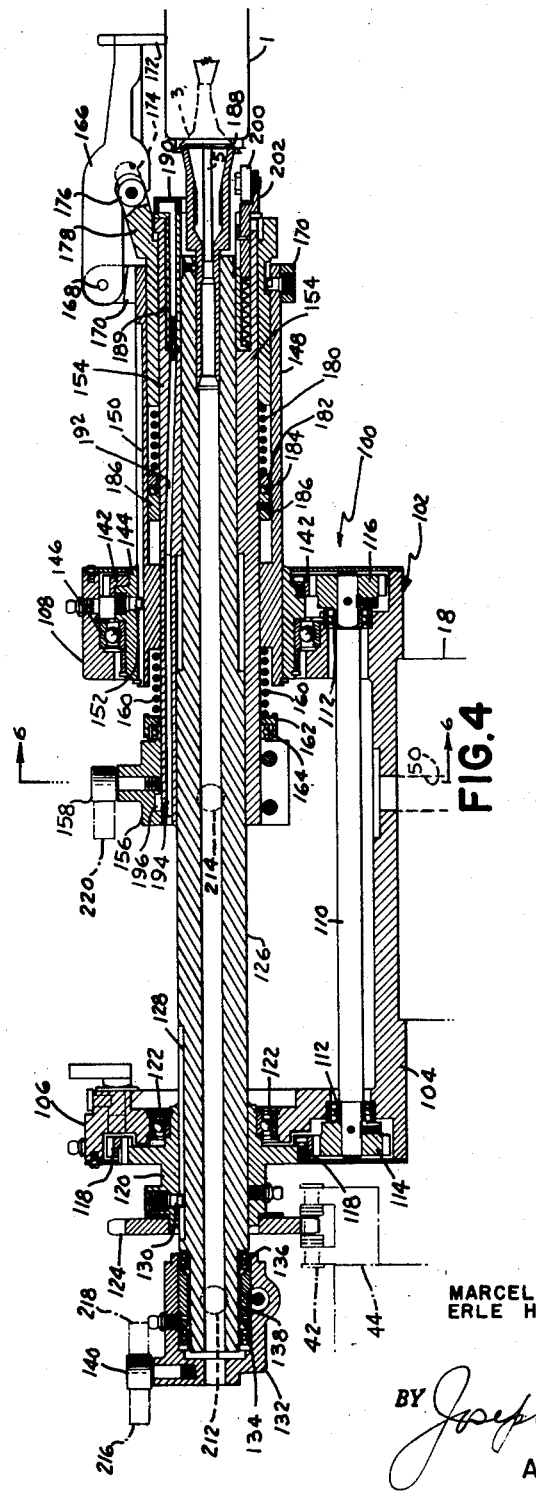
FIG. 4 is a transverse sectional view of one of the heads of the lamp sealing apparatus.

Reference will now be made to FIG. 4 wherein one of the sealing machine heads is illustrated in section. The base member of head 100 is a casting 102 formed to define a base plate 104 and a pair of bearing housings 106 and 108. A pinion shaft 110 is supported in bearings 112 disposed in housings 106 and 108. A pinion 114 is pinned to one end of pinion shaft 110 and is disposed within a suitable chamber provided therefor in bearing housing 106. Similarly, a pinion 116 is pinned to the other end of pinion shaft 110 and is also disposed in a suitable chamber within bearing housing 108. A ring gear 118 meshes with pinion 114 and is secured to mount pin shaft bushing 120 which is supported in bearing 122 in bearing housing 106. A sprocket 124 is secured to the mount pin shaft bushing 120. A mount pin shaft 126 is supported by and extends through bushing 120 in bearing housing 106 and through other supporting members in bearing housing 108 which will be described more fully below. The mount pin shaft 126 is provided with an elongated keyway 128 within which a driver dog 130, depending from bushing 120, is disposed. The left hand end of mount pin shaft 126, as viewed in FIG. 4, has a cam follower block 132 supported thereon in bearings 134 and 136 between which a bearing sleeve 138 is disposed. The cam follower block 132 supports a cam follower 140 upstanding thereon.

As noted above, the pinion shaft 110 is supported in bearings 112 in bearing housings 106 and 108, and pinions 114 and 116 are secured thereto at the ends thereof. The pinion 116, disposed within bearing housing 108, meshes with ring gear 142. Ring gear 142 is secured to a tube chuck bushing 144 supported in bearing 146 in bearing housing 108. A tube chuck shaft 148 is supported by and extends through the tube chuck bushing 144. The tube chuck shaft 148 is provided with an elongated keyway 150 within which a driver dog 152, depending from the tube chuck bushing 144, is disposed. The tube chuck shaft 148 is the outermost of three concentric, substantially tubular members extending through bearing housing 108, the intermediate member being a burner shaft 154 and the inner member being the previously mentioned mount pin shaft 126. A cam follower block 156 is secured to the inner or left hand end of burner shaft 154 as viewed in FIG. 4. This cam follower block 156 supports cam follower 158 which is upstanding thereon. A tube chuck compression spring 160, concentric with burner shaft 154, is disposed between and in abutting relationship with an internal shoulder of tube chuck shaft 148 and a pressure ring 162 secured to bearing 164 on burner shaft 154.

Figure 5:
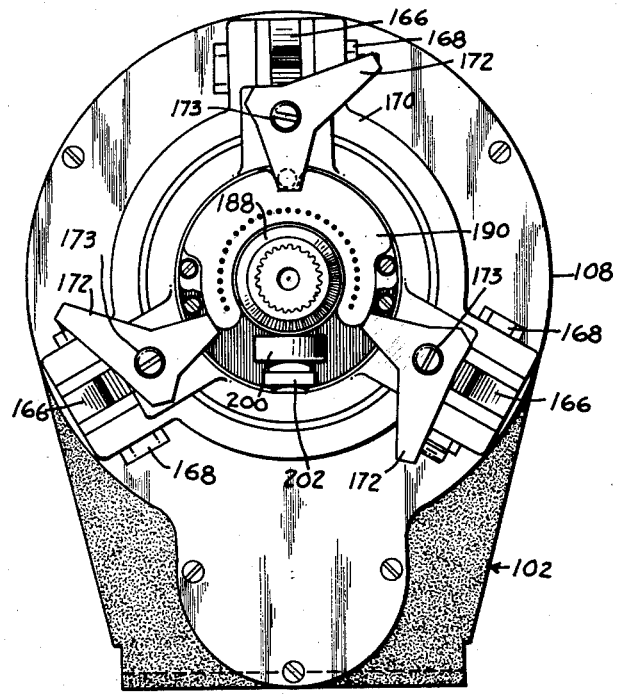
FIG. 5 is a front elevational view of the head of FIG. 4.

Three tube chuck arms 166 (FIGS. 4, 5 and 7) are mounted equidistant from one another about the outer or right hand end of tube chuck shaft 148 as viewed in FIG. 4. Each of the chuck arms 166 is pivotally mounted at 168 in collar 170 formed on the front end of tube chuck shaft 148. The free end of each tube chuck arm 166 has a tube chuck finger 172 attached thereto by a screw 173. The three tube chuck fingers 172 collectively define a chuck for gripping a lamp tube 1. Each of these fingers, as shown particularly in FIG. 5, is a three-legged member, each leg being of a different length. This makes it possible to chuck tubes of three different diameters and still support them on a common longitudinal axis, the only adjustment required being to rotate these fingers 172 about their screws 173 as pivots to thereby place legs of different lengths in tube-gripping position. The three-legged fingers 172 illustrated in the accompanying drawings have been designed specifically to accommodate T8s, T12s and T17s. However, it will be readily appreciated by those skilled in the art that fingers of other shapes may be readily employed to accommodate tubes of other diameters. The tube chuck arm 166 is provided, intermediate its ends, with a slot 174 for receiving roller 176 which rides therein. The roller 176 is supported on the outer end of a tube chuck arm control sleeve 178 which is slidably disposed in the tube chuck shaft 148 and slidably and rotatably disposed on the burner shaft 154 at the front ends thereof. A compression spring 180 is disposed about burner shaft 154 and abuts the inner end of the control sleeve 178. The compression spring 180 is backed up by a thrust washer 182 secured to bearing 184. The bearing 184 is supported by a thrust washer 186 which is pinned to burner shaft 154.

Figure 6:
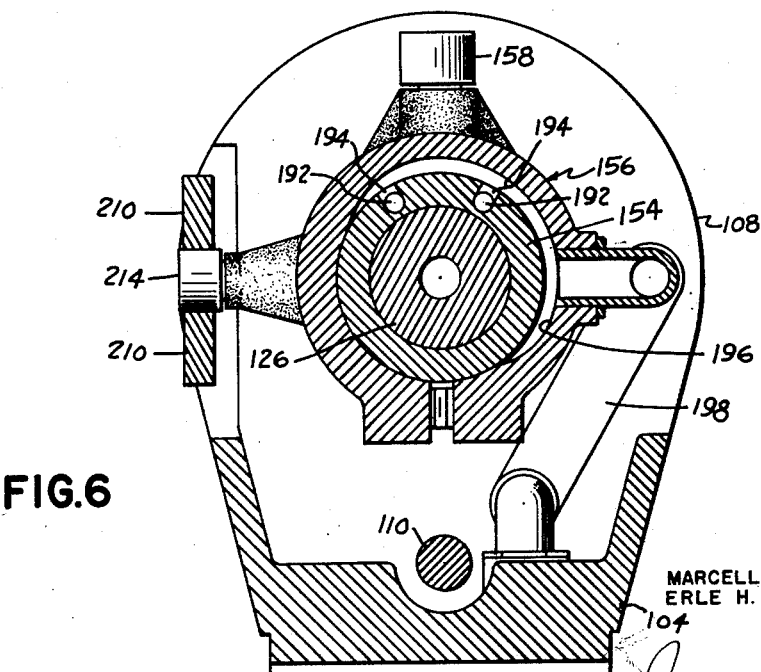
FIG. 6 is a sectional view of the head of FIG. 4, taken along the line 6—6 of FIG. 4, and showing particularly the structural arrangement for defining a path of communication through the head for feeding combustible gases to the burner thereof.
Figure 7:
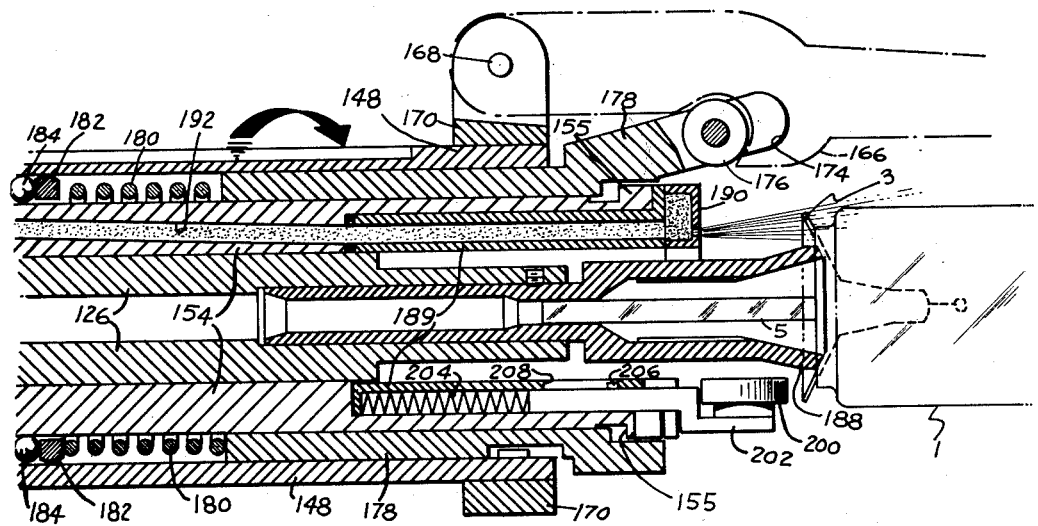
FIG. 7 is an enlarged sectional detail of the front end of the head of FIG. 4 showing particularly the burner and the seal working device and their relationship to the work.

A mount pin 188 is supported in and projects from the front end of mount pin shaft 126. A burner supporting sleeve 189 is attached to an internal shoulder formed in the burner shaft 154 near the front end thereof. A burner 190 is secured to the front face of the burner-supporting sleeve 189. The burner shaft 154 is provided with a pair of elongated chambers 192 running along substantially its entire length (FIG. 6). The burner shaft 154 is also provided, near the rear end thereof, with a pair of ports 194 through which communication is established between the chambers 192 and an arcuate cavity 196 formed in the inner face of cam follower block 156. As is shown in FIGS. 6 and 9–11 for example, a flexible tubing 198 enters the cam follower block 156. Thus combustible gases are fed to the burner 190 from and through the flexible tubing 198, the arcuate cavity 196 in cam follower block 156, ports 194 and chambers 192 in burner shaft 154. The burner supporting sleeve 189 has a seal working device associated therewith (FIG. 7). This seal working device comprises a roller 200 freely supported on the outer end of an arm 202 which is slidably disposed within a chamber defined by the burner supporting sleeve 189 and the burner shaft 154 as viewed in FIG. 7. This arm 202 is backed up by a compression spring 204 and its reciprocating movement within the aforesaid chamber is defined by a pin 206 upstanding thereon which rides in an elongated slot 208 formed in the burner supporting sleeve 189.

OPERATION OF THE HEADS

As noted above, the major components of each head are three concentric, substantially tubular members, viz., the mount pin shaft 126, the tube chuck shaft 148 and the burner shaft 154. The outer or tube chuck shaft 148 and the inner or mount pin shaft 126 rotate synchronously whereas the intermediate or burner shaft 154 does not rotate. Rotation of the mount pin shaft 126 is effected by the sprocket 124 (FIG. 4) through bushing 120 and driver dog 130 which rides in keyway 128 in shaft 126. Rotation of the tube chuck shaft 148 is effected by the sprocket 124 through bushing 120, ring gear 118, pinion 114, pinion shaft 110, pinion 116, ring gear 142, tube chuck bushing 144 and driver dog 152 which rides in keyway 150 in shaft 148. Thus, during the lamp sealing operation, the lamp tube 1 and the mount 3, the two work components which are to be joined to one another, are rotated synchronously. The burner shaft 154 is prevented from rotating by the cam follower block 156 which is clamped thereon and a pair of spaced rails 210 (FIGS. 6 and 12) within which a pair of rollers 212 and 214 ride. The rails 210 are attached to the bearings housings 106 and 108, the roller 212 is supported in cam follower block 132 and the roller 214 is supported in cam follower block 156. The rollers 212 and 214 are shown in phantom in FIG. 4.

All three shafts, i.e., the mount pin shaft 126, the tube chuck shaft 148 and the burner shaft 154 are reciprocated along their longitudinal axes during certain portions of each operating cycle of the lamp sealing machine.

Reciprocation of the mount pin shaft 126 to move the mount pin 188 on the forward end thereof into and out of mount-receiving relationship with respect to a lamp mount 3 is effected by cam follower 140 (FIGS. 4 and 9–12) upstanding on cam follower block 132 attached to the rear end of shaft 126, the cam follower 140 being actuated by bar cams 216 and 218 within which it rides.

Reciprocation of the burner shaft 154 to move burner 190 into and out of heating relationship with respect to the mount 3 and the lamp tube 1 to be sealed to one another is effected by cam follower 158 (FIGS. 4, 9 and 12) upstanding on cam follower block 156 attached to the rear end of shaft 154, the cam follower 158 being actuated by bar cams 220 and 221 along which it rides.

The tube chuck shaft 148 is advanced toward a lamp tube 1 by the forward movement of the cam follower block 156 through which the burner shaft 154 is also advanced as noted above. Forward movement of the cam follower block 156 effects forward movement of the tube chuck shaft 148 through ball bearing 164 (FIG. 4), pressure ring 162 and compression spring 160 which abuts an internal shoulder formed in the tube chuck shaft 148.

The tube chuck shaft 148 is returned by the rearward movement of the cam follower block 156 which retracts the burner shaft 154 to which it is attached. As the burner shaft 154 returns, the shoulder 155 thereof, as shown in FIGS. 4 and 7, bears against a mating shoulder formed in the tube chuck arm control sleeve 178 and urges it rearwardly. As the tube chuck arm control sleeve 178 moves rearwardly it bears against the front end of the tube chuck shaft 148 and urges it rearwardly.

The tube chuck arms 166 (FIGS. 7 and 9–11), each of which is pivotally mounted at 168 on collar 170 of tube chuck shaft 148, are actuated to move their respective fingers 172 into and out of frictional engagement with a lamp tube 1 by the tube chuck arm control sleeve 178 which, as noted above, is provided with rollers 176 which ride in slots 174 formed in the tube chuck arms 166. Actuation of the tube chuck arm control sleeve 178 is effected by the reciprocation of the burner shaft 154 through thrust washer 186 (FIGS. 4 and 7), bearing 184, thrust washer 182 and compression spring 180 which backs up the tube chuck arm control sleeve 178.

THE FRAME

Figure 1:
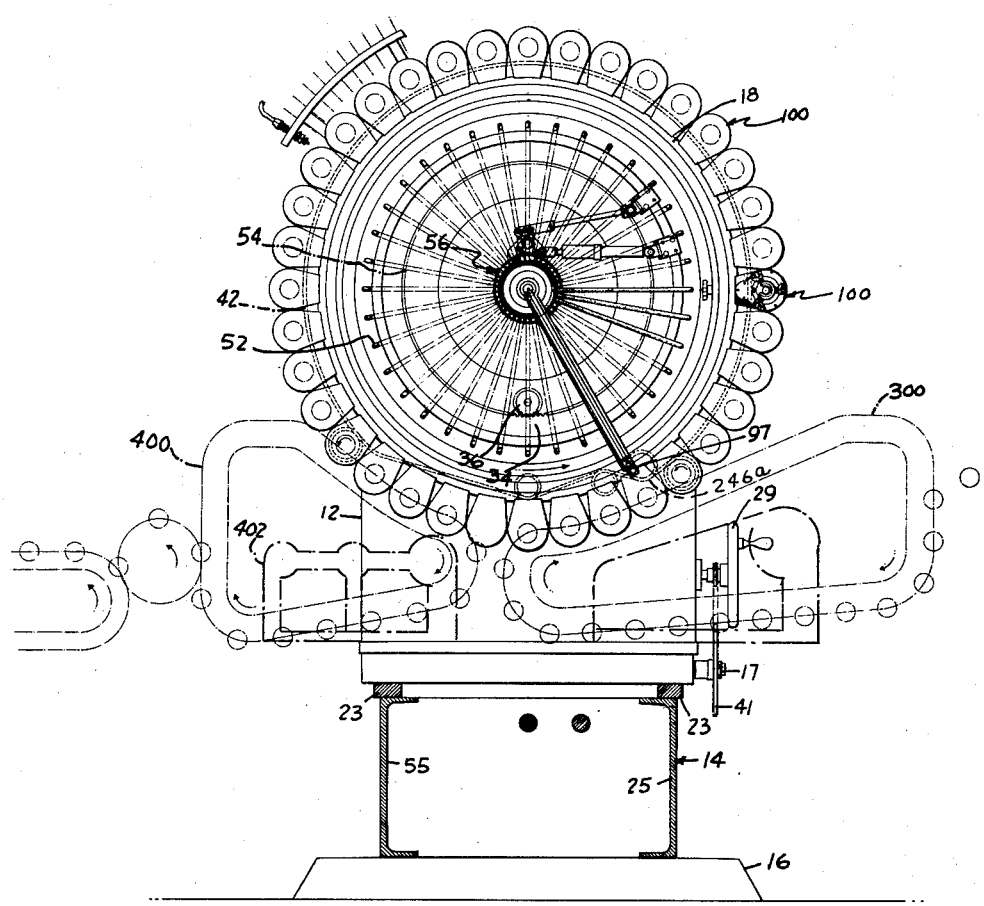
Figure 2:
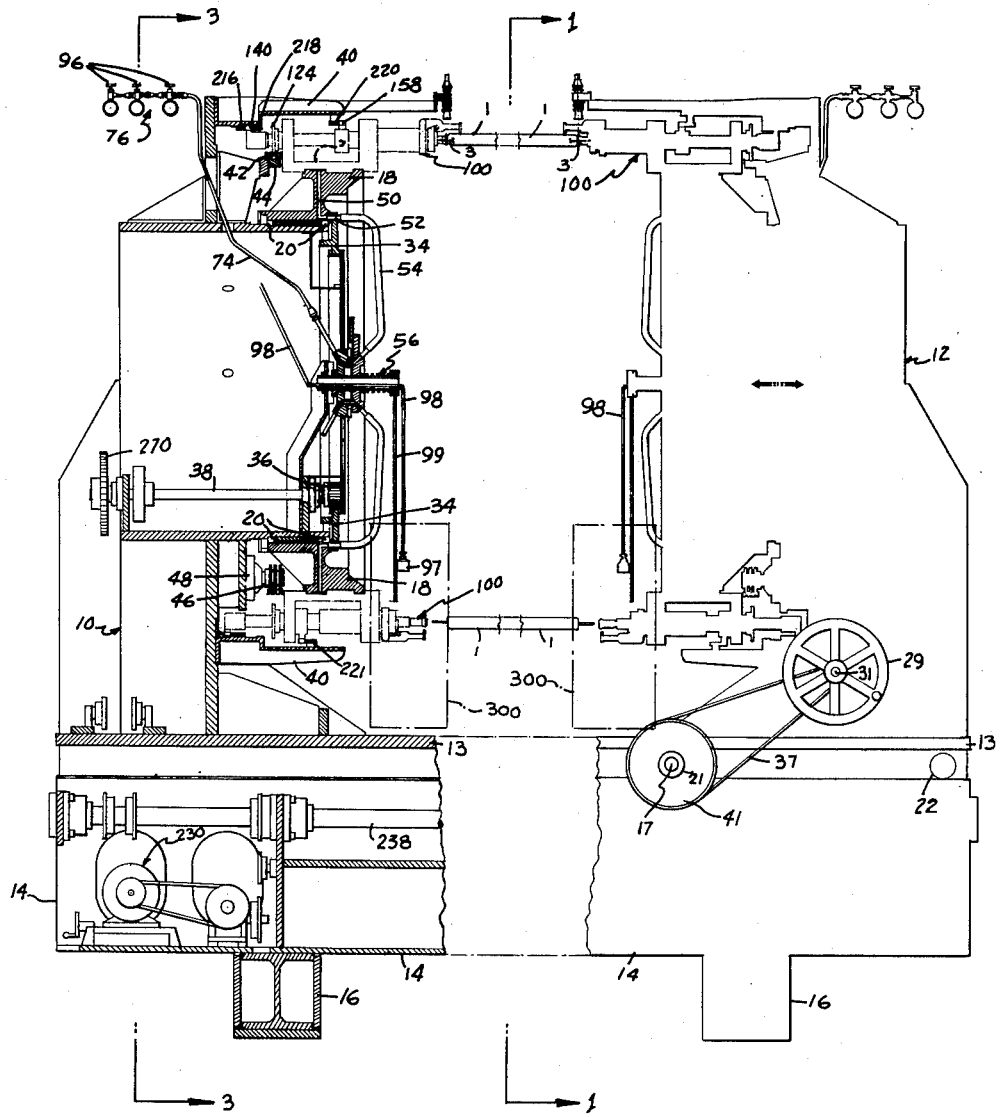
FIG. 2 is a front elevational view of the lamp sealing apparatus with the stationary pedestal and its associated parts shown in section and the heads associated with the adjustable pedestal shown in phantom.

In the specific embodiment of the apparatus of this invention illustrated in the accompanying drawings, a total of seventy-two heads 100 of the type shown in FIG. 4 and described above are employed. Referring now particularly to FIGS. 1 and 2, thirty-six of these heads 100 are supported about a stationary drum-type pedestal 10 to effect the sealing of mounts 3 to one end of lamp tubes 1 and the other thirty-six heads are supported about an adjustable drum-type pedestal 12 to effect the sealing of mounts 3 to the other end of said lamp tubes 1. Thus, in one cycle of the machine, mounts 3 are sealed in both ends of thirty-six lamp tubes 1. The pedestal 10 is fixedly secured on base 14 and the pedestal 12 is slidably supported on base 14 for longitudinal movement thereon. The base 14 rests on foot weldments 16. Except for the means employed to effect movement of the pedestal 12 longitudinally along the base 14 to provide for the sealing of lamps of different lengths, the various mechanisms associated with both pedestals 10 and 12 are substantially the same.

Figure 3:
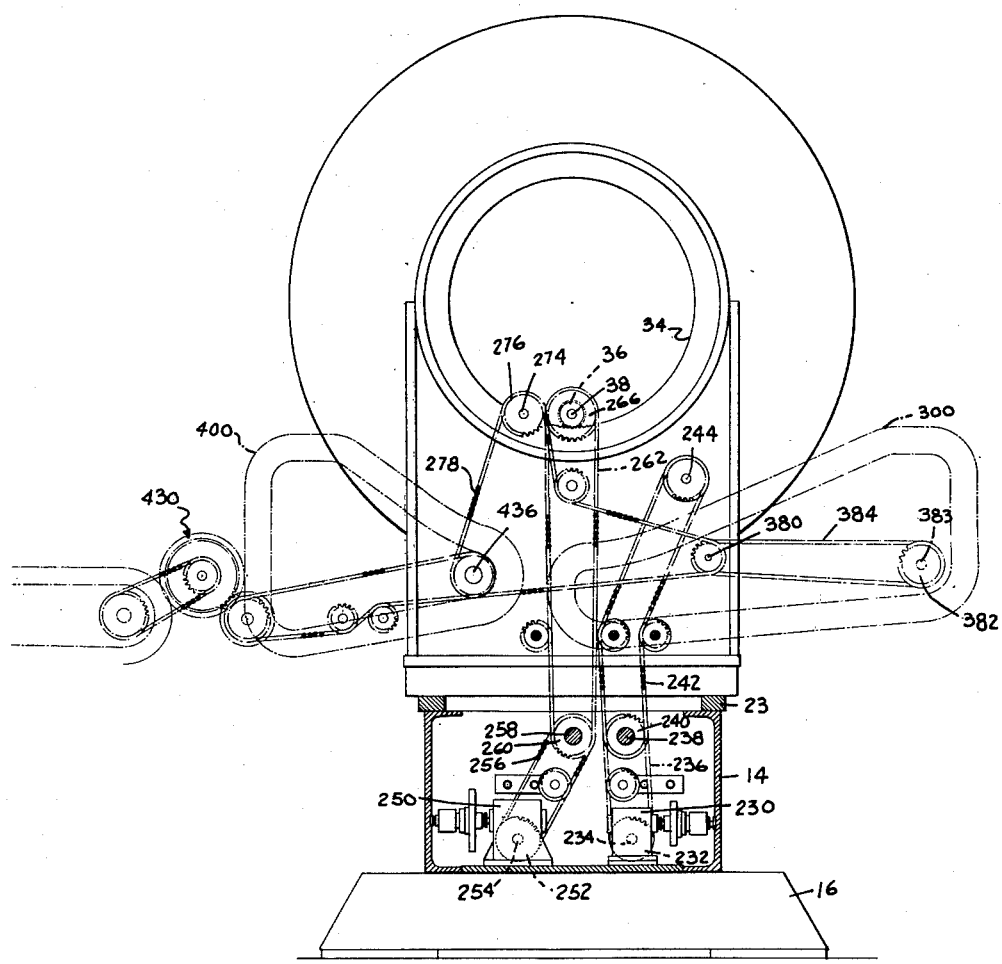
FIG. 3 is an elevational view, partly in section, taken along the line 3—3 of FIG. 2 and showing particularly the drive for the sealing apparatus, the lamp tube and mount loader and the unloader.

Referring now to FIGS. 1, 2 and 3, the heads 100 are mounted about the periphery of a spider 18 which is rotatably supported in bearings 20 on pedestal 10. An internal ring gear 34, secured to the spider 18, meshes with a spider pinion 36 mounted on a spider pinion shaft 38 rotatably supported in pedestal 10. Thus the spider 18, with the heads 100 mounted thereon, is rotated about the cylindrical portion of pedestal 10 by spider pinion shaft 38 through spider pinion 36 and internal ring gear 34.

As noted above in the section entitled "Operation of the Heads," the cam follower 140 of the head 100 rides within bar cams 216 and 218, and cam follower 158 rides on bar cam 220. As shown in FIG. 2, these bar cams 216, 218 and 220 are attached to cam supporting arms 40 mounted on pedestal 10.

In that same section it was pointed out that the mount pin shaft 126 is rotated by sprocket 124. As shown in FIGS. 2 and 4, the sprocket 124 meshes with the middle segment of a triple chain 42. The upper reach of the chain 42, as viewed in FIG. 2, rides on a head rotation chain track 44 which is attached to the pedestal 10. The lower reach of the chain 42 meshes with a triple chain idler sprocket 46 rotatably mounted on an idler sprocket support 48 attached to the pedestal 10.

THE SEALING VALVE ASSEMBLY

In the foregoing description entitled "The Heads," the structural arrangement for feeding combustible gases through each head 100 from the flexible tubing 198 to the burner 190 was described. The means employed to feed the combustible gases to the flexible tubing 198 will now be described. As shown in FIGS. 9–11, the flexible tubing 198 extends between the cam follower block 156 of the head 100 and the base plate 104 of the casting 102 thereof. The base plate 104 of the casting 102 is provided with a gas-feeding bore 103 which extends therethrough. The bore 103 in the base plate 104 of the casting 102 is in register with one end of a bore 50 in spider 18 as shown in FIG. 2. The other end of bore 50 is in register with a sweep 52 which is fitted in and extends through internal ring gear 34 and into spider 18. The sweep 52 is connected through tubing 54 to a valve assembly 56 shown generally in FIGS. 1 and 2 and detailed in FIGS. 13 and 14.

Referring now to FIGS. 13 and 14, the valve assembly 56 comprises a stationary valve plate 58 and a movable valve plate 60 supported on a valve plate shaft 62 which is in turn supported on pedestal 10. The stationary valve plate 58 is fixedly mounted on the valve plate shaft 62. The movable valve plate 60 is rotatably supported on the valve plate shaft 62 through bearing 64 and movable valve plate carrier 66 which is secured to the valve plate shaft. A compression spring 68 maintains the movable valve plate 60 in gas-tight frictional engagement with the stationary valve plate 58. The stationary valve plate 58 is provided with a plurality of ports 70 therein. The movable valve plate 60 is provided with a plurality of ports 72 therein. Each of the ports 70 in the stationary valve plate 58 is normally in register with a corresponding port 72 in the movable valve plate 60. A tubing 74 connects the desired number of consecutive ports 70 in the stationary valve plate to a gas manifold assembly 76 as shown in FIG. 2. The tubing 54 connects each of the ports 72 to a sweep 52 for communication with each of the heads 100 as described above and as shown in FIG. 2.

Indexing of the movable valve plate 60 is effected by a pawl and ratchet arrangement shown in detail in FIGS. 13, 14 and 15. As shown in these figures, a ratchet 78 is secured to the stationary valve plate 58 by screws 80, and a pawl 82 is pivotally mounted on the movable valve plate 60 by screw 84. As shown in FIGS. 14 and 15, the pawl 82 is provided with a pin 85 which rides in an elongated slot 86 in one end of a trigger arm 87. The other end of the trigger arm 87 is pivotally supported on a mounting plate 88 attached to a face of the ring gear 34. The pawl 82 is provided with a clevis 89 pivotally supported thereon. One end of a spring rod 90 is threaded into the clevis 89. The spring rod 90 is provided with a compression spring 91 concentric therewith. The spring rod 90 and its compression spring 91 are enclosed within telescoping, tubular housings 92 and 93. Tubular housing 93 is pivotally supported at 94 on mounting plate 95 which is attached to ring gear 34.

As described above in the section entitled "The Frame," the spider 18, with the heads 100 mounted thereon is rotated about the cylindrical portion of pedestal 10 by spider pinion shaft 38 through spider pinion 36 and internal ring gear 34. Since, as just described, mounting plates 88 and 95, which are connected to the pawl 82, are mounted on the ring gear 34, actuation of the pawl is effected by the movement of the ring gear 34. Movement of the ring gear 34 also effects a displacement of the tubular housings 92 and 93 with respect to the spring rod 90 and thus loads the compression spring 91. Further displacement of the trigger arm 87 after the pin 85 on the pawl 82 is in frictional engagement with an end wall of the slot 86 rocks the pawl 82 about its pivot 84 and disengages the pawl 82 from the ratchet 78. With the pawl and ratchet now disengaged, the loaded compression spring 91 within the housings 92 and 93 exerts a pulling force on the pawl and advances it a distance equal to one notch on the ratchet. Since the pawl 82 is attached to the movable valve plate 60, the advancement of the pawl a distance equal to one notch on the ratchet also effects movement of the movable valve plate 60. Advancement of the pawl a distance equal to one notch on the ratchet effects displacement of a port 72 in the movable valve plate 60 from a position in register with one port 70 in the stationary valve plate 58 to the next port 70 in the stationary valve plate.

Thus the pawl-ratchet arrangement constitutes a means for indexing the movable valve plate 60 a plurality of times during each complete revolution of the ring gear 34 which moves the heads 100 through an operating cycle. The speed with which this indexing is effected is such that a continuous flow of combustible gases to the heads 100 is maintained. Each head 100 is sequentially placed in communication with a number of different ports 70 in the stationary valve plate through its associated port 72 in the movable valve plate in order to provide for various gas mixtures to be fed to the head 100 during the sealing operation. It will be readily understood by those skilled in the art that heating of the members to be sealed to one another is effected gradually and then, after sealing has been effected, the sealed area is annealed with fires of diminishing intensity. As described above, the desired consecutive ports 70 in the stationary valve plate 58 are connected to the manifold assembly 76 by a length of tubing 74 (FIG. 2). Separate gas, air and oxygen control valves 96 are provided at each of these connections so that the quantity and proportion of these gases being fed to each head 100 may be individually regulated.

As is shown in FIG. 1, for example, a lamp tube and mount loader 300 is disposed at the feeding side of the lamp sealing apparatus and a lamp unloader 400 is located at the unloading side thereof. During loading and unloading, the burners associated with the heads 100 are off. Ignition of the burner 190 associated with each of the heads 100 is effected at the start of each sealing cycle by a pilot 97 (FIGS. 1 and 2) attached to an end of tubing 98 which is connected through valve plate shaft 62 (FIG. 13) to a source of illuminating gas. The pilot 97 is affixed to a pilot-supporting arm 99 depending from the valve plate shaft 62.

THE ADJUSTABLE PEDESTAL

As noted above in the introductory paragraph of the section entitled "The Frame," and as shown in FIG. 2, the pedestal 10 is fixedly secured on base 14 and the pedestal 12 is slidably supported for longitudinal movement thereon to provide for the sealing of lamps of different lengths. The means employed to effect this adjustment of the pedestal 12 on the base 14 will now be described, reference being made particularly to FIGS. 16–18. The pedestal 12 comprises a pair of upstanding side members, one of which is shown in FIGS. 16–18, and is identified by the reference numeral 11. These side members extend upwardly from a base member 13. A pair of spaced plates 15 are secured to and depend from the base member 13 along opposite sides thereof as shown particularly in FIGS. 17 and 18. As shown in FIG. 16, a roller drive shaft 17 and a roller shaft 19 are journaled in the plates 15 depending from the base member 13 of the pedestal 12. As shown in FIGS. 17 and 18, the shafts 17 and 19 are keyed to rollers 21 and 22 respectively which ride on a bar rail 23 secured to the angle 25 of the base 14. The lower longitudinal edges of the spaced plates 15 are provided with followers 27 which ride on the side faces of the bar rail 23. This structural arrangement permits the pedestal 12 to be rolled back and forth on the bar rail 23 of the base 14.

Movement of the pedestal 12 along the bar rail 23 is effected by rotation of a crank wheel 29. The crank wheel 29 is attached to one end of a crank wheel shaft 31 journaled in bearing 33 in side member 11 of the pedestal 12 and in a bearing in a pillow block 35 (FIG. 18) which is secured to the main body of the pedestal 12. A chain 37 extends around a sprocket 39 on crank wheel shaft 31 and a drive sprocket 41 on roller drive shaft 17. Thus rotation of the crank wheel 29 is transmitted through the chain 37 to the roller drive shaft 17 to effect linear movement of the pedestal 12 along the bar rail 23 of the base 14.

The means employed to lock the pedestal 12 in position on the base 14 will now be described. As shown in FIG. 17, a coupling 43 having a hand knob 45 attached to the outer end thereof extends through and is rotatable within the side plates 15 depending from base member 13 of pedestal 12. The coupling 43 is provided with an internally threaded bore which receives the threaded end of a tie rod 47. One end of a clamp 49 is pivotally connected to the other end of the tie rod 47. The clamp 49 is supported intermediate its ends on a clamp shaft 51 which is in turn rotatably supported in support blocks 53 depending from the base member 13 of the pedestal 12. The clamp 49, rotatable on the clamp shaft 51 as a pivot, is movable into and out of frictional engagement with angle 55 of base 14. As shown in FIG. 17, a similar clamp 57, slotted at the upper end thereof to permit passage therethrough of the tie rod 47, is secured intermediate its end on a clamp shaft 59 which is rotatably supported in support blocks 61 depending from base member 13 of pedestal 12. The other end of clamp 57 is shown in locking engagement with angle 25 of base 14. The tie rod 47 is provided with a compression spring 63 concentric therewith. One end of this compression spring 63 abuts a collar 65 fixedly secured to the tie rod 47. The other end of the compression spring abuts the upper end of clamp 57. A washer 67 abuts the inner end of coupling 43 and the opposite face of the upper end of clamp 57. This structural arrangement provides the means whereby the pedestal 12 may be secured in any adjusted position along the base 14. Movement of the clamps 49 and 57 into and out of interlocking engagement with angles 55 and 25 respectively is effected by manipulation of the hand knob 45. Clockwise rotation of the hand knob 45 as viewed in FIG. 16 draws the threaded end of the tie rod 47 into the coupling 43 and causes the clamps 49 and 57 to move into locking engagement with their respective angles 55 and 25 to secure the pedestal 12 in position. Release of the clamps 49 and 57 from locking engagement with their respective angles 55 and 25 is effected by counterclockwise rotation of the hand knob 45 as viewed in FIG. 16. This counter-clockwise rotation of hand knob 45 causes a retraction of the tie rod 47 and thus releases the clamps 49 and 57 from frictional engagement with their respective angles 55 and 25.

TUBE AND MOUNT LOADER

In the concluding paragraph of the section entitled The Sealing Valve Assembly, it was noted that a lamp tube and mount loader 300 is disposed at the feeding side of the lamp sealing apparatus and a lamp unloader 400 is located at the unloading side thereof. A lamp tube and mount loader 300 is illustrated schematically in FIGS. 1 and 3 to show its relative location with respect to the major components of the lamp sealing apparatus. The lamp tube and mount loader 300 consists of a pair of article-feeding units spaced a considerable distance from one another but yet cooperating with one another to feed a lamp tube and a pair of lamp mounts to the lamp sealing heads 100. One of these tube and mount loading units is associated with the stationary pedestal 10 and the other is associated with the adjustable pedestal 12. Since the components of these two units are substantially the same, only one of these units will be described, reference being made to FIGS. 19–26.

One of the many heads which comprise each of the tube and mount loading units is illustrated in FIGS. 19 and 20. Each head 302 comprises a base member 304 supported at its ends on a pair of endless chains 306 and 308. The upper reach of the chain 306 is guided and supported by a support plate 310. The upper reach of chain 308 is supported and guided by support plate 314. A stationary arm 318 is secured intermediate its ends to one end of the base member 304. The lower end of this stationary arm 318 is provided with a roller 320 depending therefrom which alternately engages stabilizing rails 322 (FIGS. 19, 20 and 26) and 323 (FIG. 24) during certain portions of a complete operating cycle of the tube and mount loader as described more fully below. A tube cradle 324 is supported on the stationary arm 318 at the other end thereof. As shown in FIG. 23, the tube cradle 324 is shaped to define three V-shaped pockets of different configurations, each pocket being designed to receive a lamp tube of a particular diameter. Since the tube cradles 324 are rotatably supported on their respective stationary arms 318, tubes of three different diameters may be readily accommodated while still supporting them on a common longitudinal axis by merely rotating each tube cradle to place the appropriate pocket thereof in tube-receiving position. It will be readily appreciated by those skilled in the art that tube cradles of other shapes may be readily employed to accommodate tubes of other diameters. A tube clamping arm 326 is pivotally mounted on the stationary arm 318 and is normally maintained in a closed position with respect to a lamp tube 1 extending between it and the tube cradle 324 of the stationary arm 318 by spring 328. Actuation of the tube clamping arm 326 to effect an opening thereof to release a lamp tube 1 is effected by a cam follower 330 supported by and extending laterally from the tube clamping arm 326.

As shown in FIGS. 19 and 20, a lamp mount 3, initially aligned to register with the lamp tube 1, is advanced to effect insertion thereof into the adjacent open end of the tube 1. Insertion of a lamp mount 3 into the open end of lamp tube 1 is effected by reciprocation of a cross head 332 which is supported by and rides on a cross head shaft 334 which is supported in the base member 304. As shown in FIGS. 20–22, the base plate 336 of the crosshead 332 is provided with a roller 338 on the rearwardly extending portion thereof which rides in an elongated slot 340 (FIGS. 20 and 21) formed in the base member 304 of the head 302. Detent assemblies 342 are provided to define positively the limits of the stroke of the cross head 332. The cross head 332 has a tubular sleeve portion 344 through which the cross head shaft 334 extends. A collar 346 is fixedly secured to one end of the tubular sleeve 344 of the cross head. A cam follower 348 is supported in and depends from the collar 346. A mount holder body 352 of a mount carrier 353 is rotatably supported on the other end of the tubular sleeve 344. A mount clamp arm 354 of the mount carrier 353 is pivotally supported at 356 on the mount holder body 352. A cam follower 358 is rotatably supported in the lower end of the mount clamp arm 354 and rides on cam track 360. A torsion spring 362 is disposed on the tubular sleeve 344 of the cross head 332. One end of the spring 362 is anchored in the collar 346 and the other end thereof overlies and is in frictional engagement with a laterally extending block 364 secured to or formed integral with the mount clamp arm 354.

A detail of the mount carrier 353 is illustrated in FIG. 21. As noted above, the mount holder body 352 is rotatably supported on the sleeve 344 of the cross head 332 and the mount clamp arm 354 is pivotally supported at 356 on the mount holder body 352. As is shown particularly in FIG. 21, the mount holder body 352 has a mount seating beak 366 secured thereto. A cooperating mount clamping beak 368 is secured to the mount clamp arm 354. A stop screw 370 extends through the mount holder body 352 and is normally spaced from a stop block 372 formed on the mount clamp arm 354. A compression spring 374, extending between and supported by the mount holder body 352 and the stop block 372 on the mount clamp arm 354, normally maintains the beaks 366 and 368 closed with an exhaust tube 5 of a mount 3 firmly gripped therebetween.

The torsion spring 362 described above in connection with FIGS. 19 and 20 normally maintains the mount carrier 353 in its mount-carrying position, substantially vertically as shown in FIG. 21, since one end of the torsion spring 362 overlies and is in frictional engagement with the laterally extending block 364 of the mount clamp arm 354. As just described, the compression spring 374 normally maintains the beaks 366 and 368 closed with respect to an exhaust tube 5 of a mount 3 disposed therebetween. Opening of the beaks 366 and 368 to receive or to release an exhaust tube 5 of a mount tube 3 is effected by the counter-clockwise rotation of the mount clamp arm 354 about its pivot 356. This displacement of the mount clamp arm 354 is effected to release an exhaust tube 5 from between the beaks 366 and 368 when the cam follower 358 on the lower end of the mount clamp arm 354 rides up along an inclined surface of the cam track 360. During the first portion of this displacement of the mount clamp arm 354, the mount clamp arm 354 moves toward the mount holder body 352 until the stop block 372 strikes the stop screw 370. During this movement, the compression spring 374 is compressed and the beak 368 is displaced a distance sufficient to free the exhaust tube 5. Further displacement of the mount clamp arm 354 by the cam track 360 causes the entire mount carrier 353 to rotate counterclockwise as viewed in FIG. 21 about the cross head shaft 334 to a substantially horizontal position as shown in FIG. 25 and described more fully below. When so disposed, the beaks 366 and 368 assume a position substantially as shown in phantom in FIG. 21 and the cam follower 358 then lies beneath the base member 304 of the head 302 and within a recessed portion thereof. On the return stroke, i.e., when the mount carrier 353 is returned from the substantially horizontal position to the substantially vertical position as shown in FIG. 21, the limit of the return stroke is defined by a stop screw 376 (FIG. 22) extending through the base plate 336 of the cross head 332, the return stroke being arrested when a lateral projection 351 of the mount holder body 352 strokes the stop screw 376.

TUBE AND MOUNT LOADER OPERATION

In the preceding section, the components of the lamp tube and mount loader 300 were described, reference being made particularly to FIGS. 19–22. The operation of these components during one cycle of the tube and mount loader will now be described, reference being made primarily to FIGS. 23–26. As described in the preceding section, a lamp tube 1 is received from a suitable supply thereof and carried to a delivery point where it is presented to one of the heads 100 of the lamp sealing apparatus. As described in the preceding section, a lamp mount 3 is received from a suitable supply thereof, inserted into the open end of the lamp tube 1 at each end thereof and presented to one of the heads 100 of the lamp sealing apparatus. The means employed to actuate the devices which carry the tube and the mount and present them to a head 100 of the lamp sealing apparatus will now be described, refererence being made particularly to FIGS. 23–26.

As shown in FIGS. 19 and 20 the work-carrying members are supported on and organized about a head 302 supported by and disposed between a pair of endless chains 306 and 308. As is shown in FIGS. 23 and 25, the chains 306 and 308 are driven by a chain drive shaft 380 which extends through the supporting side plates 310 and 314. The drive for the conveyor chain 308 is illustrated schematically in FIG. 25 and comprises sprocket wheel 381 on chain drive shaft 380, sprocket drive wheel 382 on shaft 383 and chain 384. A sprocket wheel 377, pinned to the shaft 383, meshes with chain 308 and thus the chain 308 is driven by the chain drive shaft 380. As shown in FIG. 23, a sprocket wheel 385 is also mounted on shaft 383 and the teeth thereof mesh with the chain 306 to drive it.

As illustrated in FIG. 23, a lamp tube 1 is fed to the tube and mount loader when the tube lamp arm 326 has been deflected to its open position by the stationary cam 386 lying in the path of the cam follower 330 which is supported on the tube clamping arm 326. Thus, as one of the heads 302 moves past the stationary cam 386, the tube clamping arm 326 is deflected thereby to permit reception of the lamp tube 1 and then the spring 328 closes the arm 326 to secure the lamp tube 1 between it and the tube cradle 324 mounted on the stationary arm 318. Release of a lamp tube 1 to a head 100 of the lamp sealing apparatus is effected when the head 302 moves past the stationary cam 387 lying in the path of the cam follower 330 supported on the tube clamping arm 326.

As illustrated in FIG. 25, and as described in detail above in connection with the description of FIG. 21, the mount clamping beak 368 is opened with respect to the mount seating beak 366 to receive therebetween the exhaust tube 5 of a mount 3. The mount clamping beak 368 is opened to receive the exhaust tube 5 of a mount 3 by the stationary cam 388 lying in the path of the cam follower 358 supported on mount clamping arm 354. As the cam follower 358 rides off of this stationary cam 388, the compression spring 374 (FIG. 21) returns the mount clamping beak 368 into gripping engagement with the exhaust tube.

As described above in the preceding section, the mount carrier 353 is supported on a cross head 332, lateral displacement of which effects insertion of the mount 3 into the adjacent open end of the lamp tube 1 as shown in FIGS. 19 and 20. This lateral displacement of the cross head 332 to effect insertion of a mount 3 into the adjacent open end of a lamp tube 1 is effected by a stationary cam 389. This stationary cam 389 is illustrated in FIGS. 19 and 26. As is shown in FIG. 26, the mount inserting cam 389 is attached to a cam-supporting plate 390 which is in turn supported on the support plate 310. As is shown in FIG. 26, the cam follower 348, which is one of the components of the cross head 332 as described above in connection with FIGS. 19 and 20, is deflected by the stationary cam 389 and thus the cross head 332 is displaced from the position thereof as shown in FIG. 19 to the FIG. 20 position with the mount 3 inserted into the open end of the lamp tube 1. During this mount inserting operation, the roller 320 depending from the stationary arm 318 of the tube carrier rides along the stabilizing rail 322.

Release of the mount 3 from the beaks 366 and 368 of the mount carrier 353 and displacement of the entire mount carrier from the substantially vertical position as shown in FIG. 21 to the substantially horizontal position as shown in FIG. 25 is effected when the cam follower 358 on the lower end of the mount clamp arm 354 engages the cam track 360 which lies in its path as described above in connection with FIG. 21. Initially the beaks 366 and 368 are opened with respect to one another to release the exhaust tube 5 and then the entire mount carrier 353 is displaced to the substantially horizontal position as shown in FIG. 25 to remove it from the path of the heads 100 of the lamp sealing apparatus. When the mount carrier 353 has cleared the heads 100 of the lamp sealing apparatus the cam follower 358 of the mount clamp arm 354 gradually rides off of the cam track 360, thus permitting the torsion spring 362 (FIGS. 19 and 20) to return the mount carrier 353 to its substantially vertical position, and the compression spring 374 then closes the mount clamping beak 368 with respect to the mount seating beak 366.

After the mount carrier 353 has been returned to the substantially vertical position as illustrated in FIG. 25 and as just described, the cross head 332 is returned from its mount-inserting position as shown in FIG. 20 to its mount-receiving position as shown in FIG. 19 in order to be in correct position to receive another mount. Return of the cross head 332 to its mount-receiving position is effected by a stationary cam 391 which lies in the path of the cam follower 348 depending from collar 346 of the crosshead. As shown in FIGS. 23 and 24, the stationary cam 391 is mounted on a cam-supporting plate 392 which is attached to the side support plate 310. Thus, as the head 302 moves past the stationary cam 391, the crosshead 332 is displaced laterally from the FIG. 20 position to the FIG. 19 position. During this displacement of the crosshead 332, the roller 320 depending from the stationary arm 318 of the lamp tube carrier rides along stabilizing rail 323 which is also mounted on the cam-supporting plate 392.

As described above, the heads 302 which support the tube and mount carriers are affixed to chains 306 and 308, the upper reaches of which ride along and are supported by supporting side plates 310 and 314 respectively and the several stationary cams which actuate the tube and mount carriers are supported on and extend laterally and inwardly from the supporting side plate 310. The supporting side plates 310 and 314 are maintained rigidly in the desired spaced relationship with respect to one another by a plurality of tie bars 393 and tie tubes 394 as shown in FIGS. 23 and 25.

LAMP UNLOADER

As mentioned above in the concluding paragraph of the section The Sealing Valve Assembly, a lamp unloader 400 is located at the unloading side of the lamp sealing apparatus as is shown schematically in FIGS. 1 and 3. The lamp unloader consists of a pair of substantially identical work-supporting and work-carrying units spaced a considerable distance from one another but yet cooperating with one another to receive a sealed lamp from the lamp sealing apparatus and carrying it away therefrom. One of these units is associated with the stationary pedestal 10 and the other is associated with the adjustable pedestal 12. Since the components of these two units are substantially the same, only one of them will be described, reference being made particularly to FIGS. 27 and 28.

The base member of one of these units which comprises the lamp unloader 400 is a bracket 402 attached to the particular pedestal with which the unit is associated. A pair of spaced side support plates 404 and 406 are attached to the bracket 402. In the illustration of the lamp unloader shown in FIG. 27, the side support plate 406 has been removed to illustrate more clearly the mechanisms disposed therebetween. The lamp unloading unit as illustrated in FIGS. 27 and 28 comprises a pair of endless chains 408 and 410 spaced from one another and carrying thereon a plurality of tube-carrying heads 412. Each tube-carrying head 412 comprises a base member 414 secured to and bridging the chains 408 and 410, a stationary jaw 416 preferably formed integral therewith, and a movable jaw 418 pivotally mounted on the stationary jaw 416 at 420. The movable jaw 418 is normally maintained closed with respect to the stationary jaw 416 by a torsion spring 422 (FIG. 28). A cam follower 424, supported on the movable jaw 418, alternately rides along a jaw opening cam 426 to open the movable jaw 418 to receive a lamp from the lamp sealing apparatus and another jaw opening cam 428 to permit the discharge of a lamp to another conveyor 430 which carries the sealed lamp to the next unit of lamp manufacturing equipment. The jaw opening cams 426 and 428 are fixedly mounted on cam supporting rods 432 mounted in the side plates 404 and 406. The two chains 408 and 410 mesh with the teeth of two sprocket wheels 434 respectively, one of which is shown in FIG. 27. The sprocket wheels 434 are attached to an unloader drive shaft 436 for driving the chains 408 and 410 to advance the heads 412 and thus carry the sealed lamps from the lamp sealing apparatus to the conveyor 430. For convenience and clarity of illustration, sprocket wheels disposed in the corners opposite the sprocket wheel 434 in FIG. 27 and conventional chain guides have been omitted.

THE DRIVE

Head Rotation

In the preceding section entitled The Heads, it was pointed out that, as shown in FIG. 4, a lamp tube 1 is held at its ends by tube chuck fingers 172, and a mount 3 is supported in each end of the tube 1 by a mount pin 188. In the preceding section entitled Operation of the Heads it was pointed out that, as shown in FIG. 4, the tube chuck shaft 148 and the mount pin shaft 126 are rotated synchronously by the triple chain 42 through the sprocket 124 in order to rotate the tube 1 about its own axis, with a mount disposed at each end thereof, during the lamp sealing operation. In the preceding section entitled The Frame, it was pointed out that, as shown in FIG. 2, the triple chain 42 meshes with the triple chain idler sprocket 46 which is rotatably mounted on the idler sprocket support 48. The drive for effecting this rotation of the tube chuck shaft 148 and the mount pin shaft 126 will now be described, reference being made to FIGS. 1–3, and 29 which is a schematic illustration.

A head rotation motor 230 is mounted on and supported by the main machine base 14. A sprocket wheel 232 is connected to the output shaft 234 of the motor 230. A chain 236 connects the output shaft 234 to a head rotation shaft 238 through the aforesaid sprocket wheel 232 and a drive sprocket wheel 240 on the head rotation shaft 238. A sprocket wheel 241 is located near one end of the head rotation shaft 238. A similar sprocket wheel 241a is slidably mounted on the head rotation shaft 238 near the other end thereof. A chain 242 connects the head rotation shaft 238 to a triple chain drive shaft 244 through the sprocket wheel 241 on shaft 238 and a sprocket wheel 248 on shaft 244. The sprocket wheel 248 is located near one end of the triple chain drive shaft 244 and a triple chain drive sprocket 246, which is in mesh with the triple chain 42, is located near the other end thereof. This arrangement provides the means for driving the triple chain 42 to effect the rotation of sprocket 124 of the head 100 as shown in FIG. 4.

In the foregoing description, the reference numbers identifying the components of the drive just described have been assigned to the drive associated with the right hand unit or fixed pedestal as shown in FIG. 29. Corresponding reference numbers with the letter designation "a" added thereto have been assigned to the corresponding parts in the left hand unit or adjustable pedestal as shown in FIG. 29.

*Spider Rotation*

In the preceding section entitled The Frame, and as illustrated in FIG. 2, it was pointed out that the heads 100 are mounted about the periphery of a pair of spiders 18 rotatably supported in bearings in pedestals 10 and 12 respectively. An internal ring gear 34, which is secured to each of the spiders, meshes with the spider pinion 36 which is secured to one end of the spider pinion shaft 38. The means employed to drive the spider pinion shaft 38 will now be described, reference being made particularly to FIGS. 2, 3 and 29.

A spider drive motor 250 is mounted on and supported by the main base 14 of the lamp sealing apparatus. A sprocket wheel 252 is connected to the output shaft 254 of the motor 250. A chain 256 connects the output shaft 254 to a spider drive shaft 258 through the aforesaid sprocket wheel 252 on the output shaft 254 and a drive sprocket wheel 260 mounted on the spider drive shaft 258 near one end thereof. A chain 262 connects the spider drive shaft 258 to the spider pinion shaft 38 through sprocket wheel 264 on shaft 258 and sprocket wheel 266 near one end of spider pinion shaft 38. As described above, spider pinion 36 is mounted on the other end of shaft 38 and meshes with the internal ring gear 34 of the spider 18.

In the foregoing description, the reference numbers identifying the components of the drive just described have been assigned to the right hand unit or fixed pedestal as shown in FIG. 29. The same reference numbers with the letter designation "a" added thereto have been assigned to the corresponding parts in the left hand unit or movable pedestal as shown in FIG. 29.

The drive for the tube and mount loader 300 and the lamp unloader 400 is a common one and is taken off of the spider drive just described. More particularly this take-off is from the spider pinion shaft 38. A gear 270 on the spider pinion shaft 38 meshes with a gear 272 on a stub shaft 274. This stub shaft 274 is also provided with a sprocket wheel 276. A chain 278 meshes with the sprocket wheel 276 on the stub shaft 274 and a sprocket wheel 280 on the chain drive shaft 380 of the tube and mount loader 300. This chain 278 also meshes with a sprocket wheel 282 on the drive shaft 436 of the lamp unloader 400. Thus the chain 278 provides the means through which the loader drive shaft 380 and the unloader drive shaft 436 are driven from the spider pinion shaft 38.

In the foregoing description, the reference numbers employed therein have been assigned to the members associated with the drive for the right hand unit or fixed pedestal as shown in FIG. 29. Similar reference numbers with the letter designation "a" added thereto have been assigned to corresponding parts associated with the left hand unit or movable pedestal as shown in FIG. 29.

OPERATION

The operation of the lamp sealing apparatus will now be described, reference being made particularly to the timing chart illustrated in FIG. 30 and FIGS. 1 and 12. Additional figures of the drawings will also be referred to specifically as the operational description is developed. At 340°, a sealed lamp has been released by a pair of co-operating heads 100, one on pedestal 10 and the other on pedestal 12, and these two heads are in their rest position ready to receive a lamp tube 1 and a pair of mounts 3, one in each end of the tube. During the travel of these two heads 100 from 340° to 360°, a lamp tube 1 and a pair of mounts 3 are being prepared for presentation thereto by the lamp tube and mount loader 300 illustrated in FIGS. 19–26. As described above in the section entitled Tube and Mount Loader, the loader 300 consists of a pair of cooperating article-feeding units, one associated with the stationary pedestal 10 and the other associated with the adjustable pedestal 12. While the heads 100 are traveling from 340° to 360°, the loader 300 is advancing to bring a lamp tube 1 and a pair of mounts 3 into alignment therewith. As illustrated in FIGS. 19–26 and described above, not only does the loader 300 advance a lamp tube 1 and a pair of mounts 3 lineally but the mounts 3 are also advanced laterally from the FIG. 19 position to the FIG. 20 position by the cam 389 (FIG. 26) so that at 0° the loader 300 has completed the task of properly orienting and positioning the three work components (lamp tube 1 and a pair of mounts 3) for the pair of heads 100 which are to receive them.

As shown in FIG. 30, from about 5° to about 30° the loader 300 releases the lamp tube 1 and the mounts 3 to a pair of sealing machine heads 100. As shown in FIG. 25, after the articles of work have been delivered to the sealing machine heads 100, the mount carrier 353 of the loader 300 is deflected from the substantially vertical position to a substantially horizontal position to clear the heads 100 of the sealing machine and are then returned to the vertical position again. As shown in FIGS. 23 and 24, the cam 391 returns the crosshead 332 from the FIG. 20 position to the FIG. 19 position to return the mount carrier 353 for reception of another mount.

Figure 8:
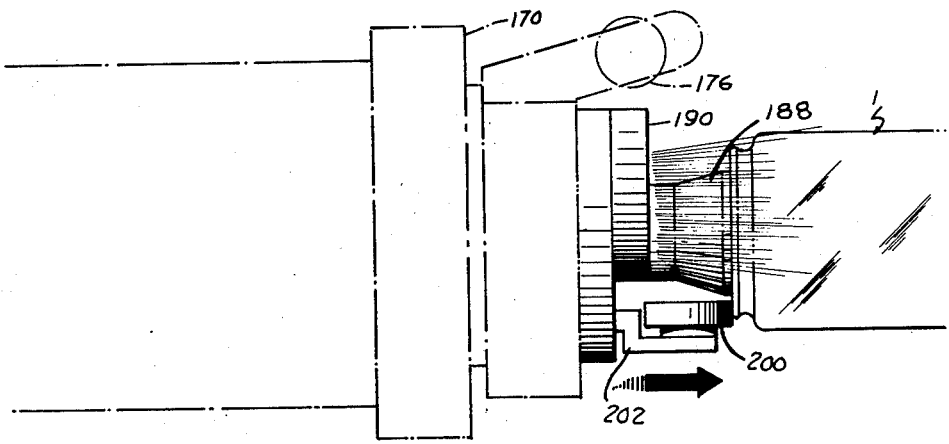
FIG. 8 is an enlarged detail of a portion of the front end of the head of FIG. 7 showing the seal working device in engagement with the work.

As just noted, release of a lamp tube 1 with a mount in each end thereof to a pair of cooperating sealing machine heads 100 is effected during travel of the heads 100 from about 5° to about 30°. As illustrated in FIG. 30, during this same period the heads 100 are prepared to receive the three work components. As described above in the section entitled Operations of the Heads, the three major components of each head 100 are three concentric, substantially tubular members, viz., the mount pin shaft 126, the tube chuck shaft 148 and the burner shaft 154, and all three are reciprocated along their longitudinal axes during certain portions of each operating cycle of the lamp sealing apparatus. As illustrated in FIG. 30, all three of these shafts are actuated during the 5° to 30° period. As shown particularly in FIGS. 4 and 9–12, the mount pin shaft 126 is advanced, by the bar cam 216 through the cam follower 140, to bring the mount pin 188 into encompassing relationship with respect to the exhaust tube 5 of a mount 3 so that the mount seats on the pin 188 as shown particularly in FIGS. 10 and 11. The burner shaft 154 is advanced, by the bar cam 220 through the cam follower 158, to bring the burner 190 into heating relationship with respect to the end of tube 1 and the mount 3 to be sealed thereto as shown particularly in FIGS. 7 and 8. As described above in the section entitled Operation of the Heads, the tube chuck shaft 148 is also actuated by the bar cam 220 through the cam follower 158, and is advanced to operate the tube chuck arm 166 and move them into gripping engagement with the lamp tube 1 as shown particularly in FIGS. 10–12.

As illustrated schematically in FIG. 30, just before the 30° point has been reached the pair of cooperating heads 100 have moved into position to receive and support the work components which the loader 300 has delivered. Starting at about 30°, the actual lamp sealing operation is initiated. At this point, as schematically illustrated in FIG. 30, the burners 190 of the heads 100 are ignited and rotation of the mount pin shaft 126 and the tube chuck shaft 148 is initiated. The burners 190 are ignited by pilots 97 (FIG. 2). Rotation of the shafts 126 and 148, to effect synchronous rotation of the work components, is effected by the triple chain 42 through the sprocket 124 as illustrated particularly in FIGS. 2, 4 and 9–11. As illustrated in FIGS. 1 and 30, the path of the triple chain 42 is such that the chain is out of engagement with sprocket 124 from about 317° to about 30°. Thus head rotation takes place only when the work components are disposed in and supported by the heads 100.

With the burners on and the heads rotating, heating of the ends of the lamp tube 1 and the mounts 3 disposed therein takes place from about 30° to about 210° (FIG. 30), at which time the burners are extinguished but the heads keep rotating until about 317° while the sealed lamp is cooling. A detail of the actual sealing operation is shown in FIG. 7. As illustrated schematically in FIG. 30 and as shown in detail in FIG. 8, from about 110° to about 119° and again from about 128° to about 137°, the burner shaft 154 is advanced closer to the work components to bring the roller 200 of the seal working device into frictional engagement with the flared portion of the mount to aid in forming the seal. It will be readily appreciated by those skilled in the art that the length of the work heating time and number of times and the duration of the seal working operations may be varied from those specifically given depending on the circumstances.

As illustrated schematically in FIG. 30, sealing has been completed and the lamp ends are cooling from about 210° to about 310°. Starting at about 315°, the unloader 400 prepares to receive the lamp and the three shafts 126, 148 and 154 which comprise the three major components of each head 100 to start to back off from the ends of the sealed lamp. Return of the mount pin shaft 126 to withdraw the mount pin 188 from encompassing relationship with respect to the exhaust tube 5 of a mount 3 is effected by bar cam 218 (FIGS. 4 and 12) through cam follower 140. Return of the burner shaft 154 is effected by bar cam 221 (FIG. 12) through cam follower 158 (FIGS. 4 and 12). As noted above in this section, and as also pointed out in the section entitled Operation of the Heads, the tube chuck shaft 148 is also actuated by the cam follower 158 and thus the cam follower 158 and the bar cam 221 return the tube chuck shaft 148 and displace the tube chuck arms 166 from gripping engagement with the lamp tube 1.

Before these several components of the head 100 have been displaced as just described, the unloader 400 has been prepared to receive the sealed lamp. As illustrated schematically in FIG. 30 and as illustrated in detail in FIG. 27, a tube-carrying head 412 of the unloader 400 moves in register with a pair of the heads 100 of the lamp sealing machine at about 318° and continues in register until about 340°. During this period, as illustrated in FIG. 27, the jaws 416 and 418 of the head 412 close on the sealed lamp and then carry it away from the lamp sealing apparatus. This completes one operating cycle.

In the timing chart illustrated in FIG. 30, a broken line entitled "Head Not Loaded" is illustratively associated with each of the solid lines identified as "Burner and Push Up—Head Loaded," "Bulb Chuck—Head Loaded" and "Mount Pin—Head Loaded." As described above, these solid lines illustrate the action of the burner shaft 154, the tube chuck shaft 148 and the mount pin shaft 126, and their associated parts respectively. The corresponding broken lines illustrate the rest position which these members can be caused to assume if for any reason it is desired not to load the sealing machine or if work components are not available in the loader. Suitable detecting and signalling devices, not shown, may be employed to do this.

What we claim is:

1. Apparatus for simultaneously sealing a lamp mount to each end of a lamp tube, said apparatus comprising: a pair of spaced pedestals; means for re-locating one of said pedestals with respect to the other so that the distance therebetween may be varied; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a holder for supporting a mount, means for gripping a lamp tube near an end thereof and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; means for rotating said spiders on which said heads are mounted while said mount holders and said tube gripping means are being rotated; and means for maintaining said burners of said paired heads ignited during rotation of said spiders and during rotation of said mount holders and said tube gripping means.

2. Apparatus for simultaneously sealing a lamp mount to each end of a lamp tube, said apparatus comprising: a pair of spaced pedestals; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a holder for supporting a mount, means for gripping a lamp tube near an end thereof and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; means for rotating said spiders on which said heads are mounted while said mount holders and said tube gripping means are being rotated; and means for maintaining said burners of said paired heads ignited during rotation of said spiders and during rotation of said mount holders and said tube gripping means.

3. Apparatus for simultaneously sealing a lamp mount to each end of a lamp tube, said apparatus comprising: a pair of spaced pedestals; means for re-locating one of said pedestals with respect to the other so that the distance therebetween may be varied; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a holder for supporting a mount, means for gripping a lamp tube near an end thereof and a burner for heating the abutting mount and lamp end to effect fusion of the mount to the lamp tube; means for simultaneously rotating the mount holders and the tube gripping means of said paired heads whereby said lamp tube and said mounts are rotated about the longitudinal axis of said lamp tube; a ring gear secured to each of said spiders; means for rotating said spiders through said ring gears whereby the heads mounted on said spiders are advanced, said advancement of said heads being effected at least during the period when said paired mount holders and tube gripping means are being rotated; and means for maintaining said burners of said paired heads ignited during rotation of said spiders and during rotation of said mount holders and said tube gripping means.

4. Apparatus for simultaneously sealing a lamp mount to each end of a lamp tube, said apparatus comprising: a pair of spaced pedestals; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a holder for supporting a mount, means for gripping a lamp tube near an end thereof and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; means for rotating said spiders on which said heads are mounted while said mount holders and said tube gripping means are being rotated; valve means supported on each of said pedestals through which combustible gases may be fed to said heads on each of said spiders, said valve means including a stationary valve plate and a movable valve plate, each of said valve plates having a plurality of ports therein in paired registration with one another; and means connecting each of said spiders to its related movable valve plate for intermittently displacing said movable valve plate with respect to its related stationary valve plate by the movement of said spider to place the ports in the movable valve plate in register with different ports in the stationary valve plate whereby various mixtures of combustible gases may be fed to said burners during the sealing operation.

5. Apparatus for simultaneously sealing a lamp mount to each end of a lamp tube, said apparatus comprising: a pair of spaced pedestals; means for re-locating one of said pedestals with respect to the other so that the distance therebetween may be varied; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a holder for supporting a mount, means for gripping a lamp tube near an end thereof and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; a ring gear secured to each of said spiders; means for rotating said spiders through said ring gears whereby the heads mounted on said spiders are advanced, said advancement of said heads being effected at least during the period when said paired mount holders and tube gripping means are being rotated; valve means supported on each of said pedestals through which combustile gases may be fed to said heads on each of said spiders, said valve means including a stationary valve plate and a movable valve plate, each of said valve plates having a plurality of ports therein in paired registration with one another; and means connecting each of said ring gears on said spiders to its related movable valve plate for intermittently displacing said movable valve plate with respect to its related stationary valve plate by the movement of said ring gear to place the ports in the movable valve plate in register with different ports in the stationary valve plate whereby various mixtures of combustible gases may be fed to said burners during the sealing operation.

6. A head assembly for sealing a lamp mount to an end of a lamp tube, said head assembly comprising: a mount pin shaft, a tube chuck shaft and a burner shaft, said shafts being concentric, the mount pin shaft being the inner one, the burner shaft being the intermediate one and the tube chuck shaft being the outer one; a tube chuck disposed at one end of said tube chuck shaft for gripping a lamp tube near one end thereof, a mount pin disposed at one end of said mount pin shaft for supporting a lamp mount in abutting relationship with respect to the end of the lamp tube to which it is to be sealed, and a burner disposed at one end of said burner shaft and in heating relationship with respect to said lamp mount abutting said lamp tube; means for synchronously rotating said mount pin shaft and said tube chuck shaft whereby said lamp tube and said lamp mount are rotated about the longitudinal axis of said lamp tube; and means for maintaining said burner ignited during rotation of said mount pin shaft and said tube chuck shaft whereby heating of the lamp mount and lamp tube to effect fusion thereof to one another is effected during said rotation.

7. A head assembly for sealing a lamp mount to an end of a lamp tube, said head assembly comprising: a mount pin shaft, a tube chuck shaft and a burner shaft, said shafts being concentric, the mount pin shaft being the inner one, the burner shaft being the intermediate one and the tube chuck shaft being the outer one; a tube chuck disposed at one end of said tube chuck shaft for gripping a lamp tube near one end thereof, a mount pin disposed at one end of said mount pin shaft for supporting a lamp mount in abutting relationship with respect to the end of the lamp tube to which it is to be sealed, and a burner disposed at one end of said burner shaft and in heating relationship with respect to said lamp mount abutting said lamp tube; means for synchronously rotating said mount pin shaft and said tube chuck shaft whereby said lamp tube and said lamp mount are rotated about the longitudinal axis of said lamp tube; means for preventing said burner shaft from rotating during rotation of said mount pin shaft and said tube chuck shaft; and means for maintaining said burner ignited during rotation of said mount pin shaft and said tube chuck shaft whereby heating of the lamp mount and lamp tube to effect fusion thereof to one another is effected during said rotation.

8. A head assembly for sealing a lamp mount to an end of a lamp tube, said head assembly comprising: a mount pin shaft, a tube chuck shaft and a burner shaft, said shafts being concentric, the mount pin shaft being the inner one, the burner shaft being the intermediate one and the tube chuck shaft being the outer one; a tube chuck disposed at one end of said tube chuck shaft for gripping a lamp tube near one end thereof, a mount pin disposed at one end of said mount pin shaft for supporting a lamp mount in abutting relationship with respect to the end of the lamp tube to which it is to be sealed, and a burner disposed at one end of said burner shaft and in heating relationship with respect to said lamp mount abutting said lamp tube; means for synchronously rotating said mount pin shaft and said tube chuck shaft whereby said lamp tube and said lamp mount are rotated about the longitudinal axis of said lamp tube; means defining a communication path for combustible gases through said burner shaft to said burner disposed on an end thereof; and means for maintaining said burner ignited during rotation of said mount pin shaft and said tube chuck shaft whereby heating of the lamp mount and lamp tube to effect fusion thereof to one another is effected during said rotation.

9. A head assembly for sealing a lamp mount to an end of a lamp tube, said head assembly comprising: a mount pin shaft, a tube chuck shaft and a burner shaft, said shafts being concentric, the mount pin shaft being the inner one, the burner shaft being the intermediate one and the tube chuck shaft being the outer one; a tube chuck disposed at one end of said tube chuck shaft for gripping a lamp tube near one end thereof, a mount pin disposed at one end of said mount pin shaft for supporting a lamp mount in abutting relationship with respect to the end of the lamp tube to which it is to be sealed, and a burner disposed at one end of said burner shaft and in heating relationship with respect to said lamp mount abutting said lamp tube; means for synchronously rotating said mount pin shaft and said tube chuck shaft whereby said lamp tube and said lamp mount are rotated about the longitudinal axis of said lamp tube; means for maintaining said burner ignited during rotation of said mount pin shaft and said tube chuck shaft whereby heating of the lamp mount and lamp tube to effect fusion thereof to one another is effected during said rotation; a seal working device; means for supporting said seal working device adjacent to said burner; and means for periodically advancing said seal working device into frictional engagement with a lamp mount supported in said mount pin while said lamp tube and said lamp mount are being rotated as aforesaid whereby working of the seal being formed is effected.

10. A lamp making machine comprising: a lamp tube and lamp mount feeding unit adapted to feed a lamp tube and a mount disposed at each end of said lamp tube; a sealing unit adapted to receive from said feeding unit said lamp tube with said lamp mounts disposed at the ends thereof and effect fusion of said mounts to the ends of said tube to define a sealed lamp; an unloading unit adapted to receive said sealed lamp from said sealing unit; said feeding unit comprising a pair of spaced conveyors and a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube, and means for advancing said mount holder of each of said paired heads toward the lamp tube supporting means associated therewith to effect insertion of a lamp mount held by said mount holder into said lamp tube; said sealing unit comprising a pair of spaced pedestals aligned with said pair of spaced conveyors of said feeding unit, a spider rotatably supported on each of said pedestals, and a plurality of heads mounted about the periphery of each of said spiders, the heads on one of said spiders being paired and aligned with the heads on the other of said spiders for receiving from said feeding unit a lamp tube with a lamp mount disposed in each end thereof, each of said heads including a holder for supporting a mount, means for gripping a lamp tube near an end thereof and a burner for heating the abutting mount and lamp tube end to effect fusion of the mount to the lamp tube; said unloading unit comprising a pair of spaced conveyors aligned with said paired heads of said sealing unit and having a plurality of lamp-supporting heads thereon, the heads on one of said conveyors being paired and aligned with the heads on the other of said conveyors for receiving a sealed lamp from the heads of said sealing unit; means for rotating in synchronism said mount holder and said tube gripping means of each head of said paired heads of said sealing unit to effect rotation of said lamp tube and said mounts about the longitudinal axis of said lamp tube while said burner of each of said paired heads is heating the abutting mount and lamp tube end to effect fusion thereof; and means for driving said pair of spaced conveyors of said feeding unit, said pair of spaced spiders of said sealing unit and said pair of spaced conveyors of said unloading unit in synchronism.

11. A lamp making machine comprising: a lamp tube and lamp mount feeding unit adapted to feed a lamp tube and a mount disposed at each end of said lamp tube; a sealing unit adapted to receive from said feeding unit said lamp tube with said lamp mounts disposed at the ends thereof and effect fusion of said mounts to the ends of said tube to define a sealed lamp; said feeding unit comprising a pair of spaced conveyors and a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube, and means for advancing said mount holder of each of said paired heads toward the lamp tube supporting means associated therewith to effect insertion of a lamp mount held by said mount holder into said lamp tube; said sealing unit comprising a pair of spaced pedestals aligned with said pair of spaced conveyors of said feeding unit, a spider rotatably supported on each of said pedestals, and a plurality of heads mounted about the periphery of each of said spiders, the heads on one of said spiders being paired and aligned with the heads on the other of said spiders for receiving from said feeding unit a lamp tube with a lamp mount disposed in each end thereof, each of said heads including a holder for supporting a mount, means for gripping a lamp tube near an end thereof and a burner for heating the abutting mount and lamp tube end to effect fusion of the mount to the lamp tube; means for rotating in synchronism said mount holder and said tube gripping means of each head of said paired heads of said sealing unit to effect rotation of said lamp tube and said mounts about the longitudinal axis of said lamp tube while said burner of each of said paired heads is heating the abutting mount and lamp tube end to effect fusion thereof; and means for driving said pair of spaced conveyors of said feeding unit and said pair of spaced spiders of said sealing unit in synchronism.

12. A lamp making machine comprising: a lamp tube and lamp mount feeding unit adapted to feed a lamp tube and a mount disposed at each end of said lamp tube; a sealing unit adapted to receive from said feeding unit said lamp tube with said lamp mounts disposed at the ends thereof and effect fusion of said mounts to the ends of said tube to define a sealed lamp; said feeding unit comprising a pair of spaced conveyors and a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube, and means for advancing said mount holder of each of said paired heads toward the lamp tube supporting means associated therewith to effect insertion of a lamp mount held by said mount holder into said lamp tube; said sealing unit comprising a pair of spaced pedestals aligned with said pair of spaced conveyors of said feeding unit, a spider rotatably supported on each of said pedestals, and a plurality of heads mounted about the periphery of each of said spiders, the heads on one of said spiders being paired and aligned with the heads on the other of said spiders for receiving from said feeding unit a lamp tube with a lamp mount disposed in each end thereof, each of said heads including a holder for supporting a mount, means for gripping a lamp tube near an end thereof and a burner for heating the abutting mount and lamp tube end to effect fusion of the mount to the lamp tube; valve means supported on each of said pedestals through which combustible gases may be fed to said heads on each of said spiders, said valve means including a stationary valve plate and a movable valve plate, each of said valve plates having a plurality of ports therein in paired registration with one another; and means connecting each of said spiders to its related movable valve plate for intermittently displacing said movable valve plate with respect to its related stationary valve plate by the movement of said spider to place the ports in the movable valve plate in register with different ports in the stationary valve plate whereby various mixtures of combustible gases may be fed to said burners during the sealing operation; means for rotating in synchronism said mount holder and said tube gripping means of each head of said paired heads of said sealing unit to effect rotation of said lamp tube and said mounts about the longitudinal axis of said lamp tube while said burner of each of said paired heads is heating the abutting mount and lamp tube end to effect fusion thereof; and means for driving said pair of spaced conveyors of said feeding unit, and said pair of spaced spiders of said sealing unit in synchronism.

13. A lamp making machine comprising: a lamp tube and lamp mount feeding unit adapted to feed a lamp tube and a mount disposed at each end of said lamp tube; a sealing unit adapted to receive from said feeding unit said lamp tube with said mounts disposed at the ends thereof and effect fusion of said mounts to the ends of said tube to define a sealed lamp; said feeding unit comprising a pair of spaced conveyors and a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube, and means for advancing said mount holder of each of said paired heads toward the lamp tube supporting means associated therewith to effect insertion of a lamp mount held by said mount holder into said lamp tube; said sealing unit comprising a pair of spaced pedestals aligned with said pair of spaced conveyors of said feeding unit, a spider rotatably supported on each of said pedestals, and a plurality of heads mounted about the periphery of each of said spiders, the heads on one of said spiders being paired and aligned with the heads on the other of said spiders for receiving from said feeding unit a lamp tube with a lamp mount disposed in each end thereof, each of said heads including a holder for supporting a mount, means for gripping a lamp tube near an end thereof and a burner for heating the abutting mount and lamp tube end to effect fusion of the mount to the lamp tube; means for advancing said paired heads on said spiders of said sealing unit toward one another at a transfer locus whereby the means for supporting a lamp tube near an end thereof and the mount holder of each of said paired heads of said sealing unit may be disposed to receive said lamp tube with said lamp mounts in the ends thereof from said lamp tube and lamp mount feeding unit; and means for displacing said mount holders of said paired heads of said lamp tube and lamp mount feeding unit at said transfer locus during the advancement of said paired heads of said sealing unit to permit complete reception of said mounts by said mount holders of said sealing unit heads; means for rotating in synchronism said mount holder and said tube gripping means of each head of said paired heads of said sealing unit to effect rotation of said lamp tube and said mounts about the longitudinal axis of said lamp tube while said burner of each of said paired heads is heating the abutting mount and lamp tube end to effect fusion thereof; and means for driving said pair of spaced conveyors of said feeding unit, and said pair of spaced spiders of said sealing unit in synchronism.

14. Apparatus for feeding a lamp tube and a pair of lamp mounts to a lamp sealing machine, said apparatus comprising: a pair of spaced conveyors; a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube; means for driving said conveyors synchronously to advance the paired heads thereon from a work-receiving position to a work-delivery position and then back to said work-receiving position; means for advancing said mount holder of each of said paired heads toward the lamp tube supporting means associated therewith during the advancement of said heads from said work-receiving position to said work-delivery position to effect insertion of a lamp mount into said lamp tube; and means for retracting said mount holder of each of said paired heads during the advancement of said heads from said work-delivery position to said work-receiving position.

15. Apparatus for feeding a lamp tube and a pair of lamp mounts to a lamp sealing machine, said apparatus comprising: a pair of spaced conveyors; a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube; means for driving said conveyors synchronously to advance the paired heads thereon from a work-receiving position to a work-delivery position and then back to said work-receiving position; means for advancing said mount holder of each of said paired heads toward the lamp tube supporting means associated therewith during the advancement of said heads from said work-receiving position to said work-delivery position to effect insertion of a lamp mount into said lamp tube; means for displacing said mount holder of each of said work-supporting heads from a substantially vertical disposition to a substantially horizontal disposition at said work-delivery position and returning it to said substantially vertical disposition during the travel of said heads from said work-delivery position to said work-receiving position; and means for retracting said mount holder of each of said paired heads during the advancement of said heads from said work-delivery position to said work-receiving position.

16. Apparatus for simultaneously sealing a lamp mount to each end of a lamp tube, said apparatus comprising: a pair of spaced pedestals; means for re-locating one of said pedestals with respect to the other so that the distance therebetween may be varied; a spider rotatably supported in each of said pedestals; a plurality of heads mounted about the periphery of each of said spiders, the heads on one of said spiders being paired and aligned with the heads on the other of said spiders for supporting a lamp tube and a pair of mounts therebetween with the mounts abutting the open ends of the lamp tube, and each of said heads including a mount pin for supporting a mount, a tube chuck for gripping a lamp tube near an end thereof, means for adjusting said chuck whereby lamp tubes of different diameters may be supported on a common longitudinal axis and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; means for rotating said spiders on which said heads are mounted while said mount holders and said tube gripping means are being rotated; and means for maintaining said burners of said paired heads ignited during rotation of said spiders and during rotation of said mount holders and said tube gripping means.

17. Apparatus for simultaneously sealing a lamp mount to each end of a lamp tube, said apparatus comprising: a pair of spaced pedestals; a spider rotatably supported in each of said pedestals; a plurality of heads mounted about the periphery of each of said spiders, the heads on one of said spiders being paired and aligned with the heads on the other of said spiders for supporting a lamp tube and a pair of of mounts therebetween with the mounts abutting the open ends of the lamp tube, and each of said heads including a mount pin for supporting a mount, a tube chuck for gripping a lamp tube near an end thereof, means for adjusting said chuck whereby lamp tubes of different diameters may be supported on a common longitudinal axis and a burner for heating the abutting mount and lamp tube end to effect fusion of the mount to the lamp tube; means for simultaneously rotating the mount holders and the tube gripping means of said paired heads whereby said lamp tube and said mounts are rotated about the longitudinal axis of said lamp tube; means for rotating said spiders on which said heads are mounted while said mount holders and said tube gripping means are being rotated; and means for maintaining said burners of said paired heads ignited during rotation of said spiders and during rotation of said mount holders and said tube gripping means.

18. A head assembly for sealing a lamp mount to an end of a lamp tube, said head assembly comprising: a mount pin shaft, a tube chuck shaft and a burner shaft, said shafts being concentric, the mount pin shaft being the inner one, the burner shaft being the intermediate one and the tube chuck shaft being the outer one; a tube chuck disposed at one end of said tube chuck shaft for gripping a lamp tube near one end thereof, a mount pin disposed at one end of said mount pin shaft for supporting a lamp mount in abutting relationship with respect to the end of the lamp tube to which it is to be sealed, and a burner disposed at one end of said burner shaft and in heating relationship with respect to said lamp mount abutting said lamp tube; means for adjusting said tube chuck whereby lamp tubes of different diameters may be supported on a common longitudinal axis; means for synchronously rotating said mount pin shaft and said tube chuck shaft whereby said lamp tube and said lamp mount are rotated about the longitudinal axis of said lamp tube; and means for maintaining said burner ignited during rotation of said mount pin shaft and said tube chuck shaft whereby heating of the lamp mount and lamp tube to effect fusion thereof to one another is effected during said rotation.

19. Apparatus for feeding a lamp tube and a pair of lamp mounts to a lamp sealing machine, said apparatus comprising: a pair of spaced conveyors; a plurality of work-supporting heads on each of said conveyors, the heads on one of said conveyors being paired and aligned with the heads on the other of said conveyors, each of said heads including means for supporting said lamp tube near an end thereof and a mount holder for supporting a lamp mount in axial alignment with said lamp tube; means for adjusting said lamp tube supporting means of each of said heads whereby lamp tubes of different diameters may be supported on a common longitudinal axis; means for driving said conveyors synchronously to advance the paired heads thereon from a work-receiving position to a work-delivery position and then back to said work-receiving position; means for advancing said mount holder of each of said paired heads toward the lamp tube supporting means associated therewith during the advancement of said heads from said work-receiving position to said work-delivery position to effect insertion of a lamp mount into said lamp tube; and means for retracting said mount holder of each of said paired heads during the advancement of said heads from said work-delivery position to said work-receiving position.

20. A lamp making machine comprising: a lamp tube and lamp mount feeding unit adapted to feed a lamp tube and a mount disposed at each end of said lamp tube; a sealing unit adapted to receive from said feeding unit said lamp tube with said lamp mounts disposed at the ends thereof and effect fusion of said mounts to the ends of said tube to define a sealed lamp; said feeding unit comprising a pair of spaced conveyors and a plurality of work-supporting heads on each of said conveyors, the heads on one of said conveyors being paired and aligned with the heads on the other of said conveyors, each of said heads including means for supporting said lamp tube near an end thereof, a mount holder for supporting a lamp mount in axial alignment with said lamp tube and means for adjusting said lamp tube supporting means of each of said heads whereby lamp tubes of different diameters may be supported on a common longitudinal axis, and means for advancing said mount holder of each of said paired heads toward the lamp tube supporting means associated therewith to effect insertion of a lamp mount held by said mount holder into said lamp tube; said sealing unit comprising a pair of spaced pedestals aligned with said pair of spaced conveyors of said feeding unit, a spider rotatably supported on each of said pedestals, and a plurality of heads mounted about the periphery of each of said spiders, the heads on one of said spiders being paired and aligned with the heads on the other of said spiders for receiving from said feeding unit a lamp tube with a lamp mount disposed in each end thereof, each of said heads including a mount pin for supporting a mount, a tube chuck for gripping a lamp tube near an end thereof, means for adjusting said chuck whereby lamp tubes of different diameters may be supported on a common longitudinal axis and a burner for heating the abutting mount and lamp tube end to effect fusion of the mount to the lamp tube; means for rotating in synchronism said mount holder and said tube gripping means of each head of said paired heads of said sealing unit to effect rotation of said lamp tube and said mounts about the longitudinal axis of said lamp tube while said burner of each of said paired heads is heating the abutting mount and lamp tube end to effect fusion thereof; and means for driving said pair of spaced conveyors of said feeding unit and said pair of spaced spiders of said sealing unit in synchronism.

References Cited in the file of this patent

UNITED STATES PATENTS

| | | |
|---|---|---|
| 2,575,746 | Cartun | Nov. 20, 1951 |
| 2,721,422 | Baker et al. | Oct. 25, 1955 |